United States Patent
Tully

(10) Patent No.: US 10,769,353 B2
(45) Date of Patent: *Sep. 8, 2020

(54) DYNAMIC STREAMING CONTENT PROVIDED BY SERVER AND CLIENT-SIDE TRACKING APPLICATION

(71) Applicant: Oath Inc., New York, NY (US)

(72) Inventor: Timothy Michael Tully, Fremont, CA (US)

(73) Assignee: Oath Inc., New York, NY (US)

( * ) Notice: Subject to any disclaimer, the term of this patent is extended or adjusted under 35 U.S.C. 154(b) by 165 days.

This patent is subject to a terminal disclaimer.

(21) Appl. No.: 15/966,457

(22) Filed: Apr. 30, 2018

(65) Prior Publication Data

US 2018/0246863 A1 Aug. 30, 2018

Related U.S. Application Data

(63) Continuation of application No. 14/170,393, filed on Jan. 31, 2014, now Pat. No. 9,959,255.

(51) Int. Cl.
*G06F 17/20* (2006.01)
*G06F 40/14* (2020.01)
(Continued)

(52) U.S. Cl.
CPC .............. *G06F 40/14* (2020.01); *G06F 3/048* (2013.01); *G06F 3/0485* (2013.01); *G06F 40/146* (2020.01)

(58) Field of Classification Search
CPC .... G06F 3/048; G06F 3/0485; G06F 17/2247; G06F 17/2252
See application file for complete search history.

(56) References Cited

U.S. PATENT DOCUMENTS 5,796,952 A 8/1998 Davis et al.
6,038,601 A 3/2000 Lambert et al.
(Continued)

FOREIGN PATENT DOCUMENTS

CN 10284190 A 12/2012
WO 0075814 A1 12/2000

OTHER PUBLICATIONS

Non-Final Office Action cited in U.S. Appl. No. 14/170,377 dated Dec. 31, 2015, 45 pgs.
(Continued)

*Primary Examiner* — Mohammed H Zuberi
(74) *Attorney, Agent, or Firm* — Cooper Legal Group, LLC

(57) ABSTRACT

A system can stream content items and ad items to a user interface of a client-side application (such as a web browser) without refreshing the user interface and by requesting such items from a local cache and/or a remote cache associated with the client-side application or the user interface. The remote cache can operate much like a local cache for the client-side application or the user interface. Items can be streamed to a user interface without refreshing the user interface and by requesting such items from a remote cache dedicated to caching the items that can be presented by the user interface. Because the tracking of such items and the tracking of the interactions with such items creates such large amounts of data, communicating the tracked data may be impracticable without use of a system that can effectively compress associated instrumentation data.

20 Claims, 10 Drawing Sheets

(51) Int. Cl.
G06F 40/146 (2020.01)
G06F 3/0485 (2013.01)
G06F 3/048 (2013.01)

(56) References Cited

U.S. PATENT DOCUMENTS

| | | |
|---|---|---|
| 6,769,032 B1 | 7/2004 | Katiyar et al. |
| 6,883,032 B1 | 4/2005 | Dempski |
| 7,089,194 B1 | 8/2006 | Berstis et al. |
| 7,349,827 B1 | 3/2008 | Hiller et al. |
| 7,350,704 B2 | 4/2008 | Barsness et al. |
| 7,975,019 B1 | 7/2011 | Green et al. |
| 8,099,739 B1 | 1/2012 | Peterson |
| 8,215,264 B2 | 7/2012 | Hong et al. |
| 8,595,186 B1 | 11/2013 | Mandyam et al. |
| 2002/0078191 A1 | 6/2002 | Lorenz |
| 2002/0165954 A1 | 11/2002 | Eshghi et al. |
| 2003/0037181 A1 | 2/2003 | Freed |
| 2003/0163563 A1 | 8/2003 | Bean |
| 2004/0133848 A1 | 7/2004 | Hunt |
| 2005/0114430 A1 | 5/2005 | Zheng et al. |
| 2005/0138047 A1 | 6/2005 | Liu et al. |
| 2006/0036935 A1 | 2/2006 | Warner et al. |
| 2006/0259585 A1 | 11/2006 | Keohane et al. |
| 2007/0118910 A1 | 5/2007 | Taylor |
| 2007/0255821 A1 | 11/2007 | Ge |
| 2008/0184128 A1 | 7/2008 | Swenson |
| 2009/0063262 A1 | 3/2009 | Mason |
| 2009/0106687 A1 | 4/2009 | Se Souza Sana et al. |
| 2010/0095208 A1* | 4/2010 | White ............... G06F 16/9577 715/704 |
| 2010/0235321 A1 | 9/2010 | Shukla et al. |
| 2011/0125759 A1 | 5/2011 | Querel et al. |
| 2011/0213822 A1 | 9/2011 | Yavilevich et al. |
| 2011/0246879 A1* | 10/2011 | White ............... G06F 16/958 715/704 |
| 2012/0005582 A1 | 1/2012 | Webber et al. |
| 2012/0022926 A1 | 1/2012 | Ramanathan |
| 2012/0191802 A1 | 7/2012 | Rodrigues |
| 2013/0097236 A1 | 4/2013 | Khoreshad et al. |
| 2013/0132833 A1 | 5/2013 | White et al. |
| 2013/0145252 A1 | 6/2013 | Lie et al. |
| 2013/0305170 A1 | 11/2013 | de Souza |
| 2013/0339485 A1 | 12/2013 | Sen |
| 2014/0007187 A1 | 1/2014 | Harrison |
| 2014/0040437 A1 | 2/2014 | Mitsuya et al. |
| 2014/0169158 A1 | 6/2014 | Mishra et al. |
| 2014/0280515 A1 | 9/2014 | Wei et al. |
| 2015/0067024 A1 | 3/2015 | Nesbitt |
| 2016/0275092 A1* | 9/2016 | Black ............... G06F 3/0484 |
| 2018/0060089 A1* | 3/2018 | Hunigan ............ G06F 16/9577 |
| 2019/0146616 A1* | 5/2019 | White ............... G06F 11/3438 715/704 |
| 2020/0110899 A1* | 4/2020 | Atoun ............... G06F 21/84 |

OTHER PUBLICATIONS

Reply Non-Final Office Action cited in U.S. Appl. No. 14/170,377 dated Mar. 31, 2016, 11 pgs.
Final Office Action cited in U.S. Appl. No. 14/170,377 dated Jul. 12, 2016, 46 pgs.
Reply Final Office Action cited in U.S. Appl. No. 14/170,377 dated Nov. 14, 2016, 13 pgs.
Notice of Allowance cited in U.S. Appl. No. 14/170,377 dated May 17, 2017, 24 pgs.
Notice of Allowance cited in U.S. Appl. No. 14/170,377 dated Jul. 13, 2017, 7 pgs.
Non-Final Office Action cited in U.S. Appl. No. 14/170,393 dated Jan. 13, 2016, 42 pgs.
Reply Non-Final Office Action cited in U.S. Appl. No. 14/170,393 dated Jun. 13, 2016, 14 pgs.
Final Office Action cited in U.S. Appl. No. 14/170,393 dated Feb. 3, 2017, 68 pgs.
Reply Final Office Action cited in U.S. Appl. No. 14/170,393 dated May 3, 2017, 15 pgs.
Notice of Allowance cited in U.S. Appl. No. 14/170,393 dated Dec. 5, 2017, 15 pgs.
Amendment after Notice of Allowance cited in U.S. Appl. No. 14/170,393 dated Mar. 5, 2018, 9 pgs.
Non-Final Office Action cited in U.S. Appl. No. 14/170,402 dated May 20, 2015, 51 pgs.
Reply Non-Final Office Action cited in U.S. Appl. No. 14/170,402 dated Sep. 21, 2015, 13 pgs.
Non-Final Office Action cited in U.S. Appl. No. 14/170,402 dated Dec. 30, 2015, 45 pgs.
Reply Non-Final Office Action cited in U.S. Appl. No. 14/170,402 dated Mar. 30, 2016, 12 pgs.
Final Office Action cited in U.S. Appl. No. 14/170,402 dated Jun. 10, 2016, 29 pgs.
Reply Final Office Action cited in U.S. Appl. No. 14/170,402 dated Nov. 10, 2016, 17 pgs.
Notice of Allowance cited in U.S. Appl. No. 14/170,402 dated Jan. 25, 2017, 17 pgs.
Corrected Notice of Allowance cited in U.S. Appl. No. 14/170,402 dated May 17, 2017, 3 pgs.
Non-Final Office Action cited in U.S. Appl. No. 14/499,971 dated Nov. 2, 2017, 25 pgs.
Reply Non-Final Office Action cited in U.S. Appl. No. 14/499,971 dated Feb. 2, 2017, 9 pgs.
Final Office Action cited in U.S. Appl. No. 14/499,971 dated May 31, 2017, 24 pgs.
Reply Final Office Action cited in U.S. Appl. No. 14/499,971 dated Aug. 8, 2017, 10 pgs.
Non-Final Office Action cited in U.S. Appl. No. 14/499,971 dated Feb. 6, 2018, 22 pgs.
Reply Non-Final Office Action cited in U.S. Appl. No. 14/499,971 dated May 7, 2018, 13 pgs.
"Document Object Model from Wikipedia, the free encyclopedia", Oct. 1998, reprinted from the Internet at: https://en.wikipedia.org/wiki/Document_Object_Model 5 pgs.
"JSON From Wikipedia", May 2018, reprinted from the Internet at: https://en.wikipedia.org/wiki/Document_Object_Model, 12 pgs.
"Web Worker from Wikipedia", May 2018, reprinted from the Internet at: https://en.wikipedia.org/wikiWeb_worker, 4 pgs.
"Yahoo! Query Language from Wikipedia", Sep. 2013, reprinted from the Internet at: https://en.wikipedia.org/wiki/Yahoo!_Query_Language, 1 pg.
Ajan (Programming) from Wikipedia, Jan. 2014, preprinted from the Internet at: https://en.wikipedia.org/wiki/Ajax_%28programming%29, 4 pgs.
"Cross-Origin Reseouce Sharing from Wikipedia", Jan. 2014, reprinted from the Internet at: https://en.wikipedia.org/wiki/Cross-origin_resource_sharing, 4 pgs.
"JSRuntime is not officially single-threaded", Jan. 2012, Luke Wagner's Blog, reprinted from the Internet at: https://blog.mozilla.org/luke/2012/01/24/jsruntime-is-now-officially-single-threaded/, 3 pgs.
"Infinite scrolling using AJAX, Javascript/Query, the DOM and Facebook Like Button", Dec. 2012, reprinted from the Internet at: https://stackoverflow.com/questions/14062191/infinite-scrolling-using-ajax-javascript-jquery-the-dom-and-facebook-like-button, 2 pgs.
"Tracking and Presenting User Attention for collaborative Browsing Using Heterogeneous Devices", Michelle Yan, James Shaw, Vahid Khamsi and Shih-Ping Liou, Jul. 2003, IEEE, International Conference on Multimedia and Expo, pp. 1-145-1-148.
EP Search Report cited in EP Application No. 15153291.8 dated Jul. 2, 2015, 10 pgs.
First Chinese Office Action cited in Chinese Application No. 201510038468.4 dated Aug. 25, 2017, 21 pgs.
Second Chinese Office Action cited in Chinese Application No. 201510038468.4 dated May 16, 2018.
Examination Report cited in EP Application No. 15153291.8 dated Jun. 15, 2018, 6 pgs.

* cited by examiner

DYNAMIC STREAMING CONTENT PROVIDED BY SERVER AND CLIENT-SIDE TRACKING APPLICATION

RELATED APPLICATION

This application claims priority to and is a continuation of U.S. application Ser. No. 14/170,393, filed on Jan. 31, 2014, entitled "DYNAMIC STREAMING CONTENT PROVIDED BY SERVER AND CLIENT-SIDE TRACKING APPLICATION", which is incorporated herein.

BACKGROUND

This application relates to communicating compressed data across a network from a client device running a client-side application (such as web browser). This application also relates to techniques for streaming content via a client-side application, such as techniques for streaming content to a page view displayed by a web browser. Further, this application relates to compressing data associated with streaming content, including content data and user interaction data associated with a content stream.

Amongst complex client-side applications and page views of websites, a growing amount of content and data are being rendered and tracked over the Internet. In some instances, the rate of growth in the amount of content and data provided and tracked exceeds the growth rate of bandwidth and communications speed per costs. Contemporary remedies for communicating more data faster usually focus on improving the communications channels. Another remedy is to change the data being communicated so that it is more concise or at least smaller.

One known way to make data more concise or at least smaller is to compress it. For example, it is known and common to compress email attachments to increase the speed in which an email attachment is uploaded for communication via an email, communicated across a network between email servers, and eventually downloaded by a receiving email server and a user that clicks to download the attachment. Because of such demands, compression has evolved throughout the Information Age and progressing information systems have been configured to include data compression for many reasons.

However, contemporary methods and systems for communicating tracked content data and user interaction data over the Internet for analysis, which effectively employ data compression, can be improved. Described herein are example improvements.

Additionally, with regard to delivering content over the Internet, especially through a stream, performance and seamlessness of presenting new content to a user still has hiccups, especially when a user device includes or is connected to a link having limited bandwidth. Described herein are also systems and methods for improving seamlessness in the delivery of content over the Internet and ways to compress that data and associated data for communication to a server, such as a web analytics server.

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale, emphasis instead being placed upon illustrating the principles of the system.

In the drawings, like referenced numerals designate corresponding parts throughout the different views.

DETAILED DESCRIPTION

Subject matter will now be described more fully hereinafter with reference to the accompanying drawings, which form a part hereof, and which show, by way of illustration, specific examples. Subject matter may, however, can be embodied in a variety of different forms and, therefore, covered or claimed subject matter is intended to be construed as not being limited to any examples set forth herein; examples are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Overview of Dynamic Streaming Content Provided by a Client-Side Application

Described herein are systems, products, and methods for streaming content items and ad items to a user interface of a client-side application (such as a web browser) without refreshing the user interface and by requesting such items from a local cache and/or a remote cache associated with the client-side application or the user interface. In an example, the remote cache can operate much like a local cache for the client-side application and/or the user interface. Such items can also be streamed to a user interface without refreshing the user interface and by requesting such items from a remote cache dedicated to caching at least part of the items that can be presented by the user interface up to a threshold period of time. Because the tracking of such items and the tracking of the interactions with such items creates such large amounts of data, communicating the tracked data may be impracticable without use of systems, products, and methods for effectively compressing instrumentation data and communicating such compressed data over the Internet to a server.

Regarding the data compressed, instrumentation data may include tracked content data, tracked page view data, tracked user interaction data, and tracked client-side application data. Tracked content data may include tracked data related to the substance of content and any data related to human perceivable features of that content, such as audio and/or visual features of the content. Tracked page view data may include tracked data related to human perceivable features of a page view and one or more sections of that page view. Tracked user interaction data may include tracked data related to user interactions with the page view and its contents, such as clicks and other types of gestures aimed at aspects of the page view and its contents. Tracked client-side application data may include tracked data related to client-side application attributes and parameters, such as web browser versions and technical and visual features of those versions. Tracked client-side application data may also include tracked configuration data.

DESCRIPTION OF THE DRAWINGS

Figure 1:
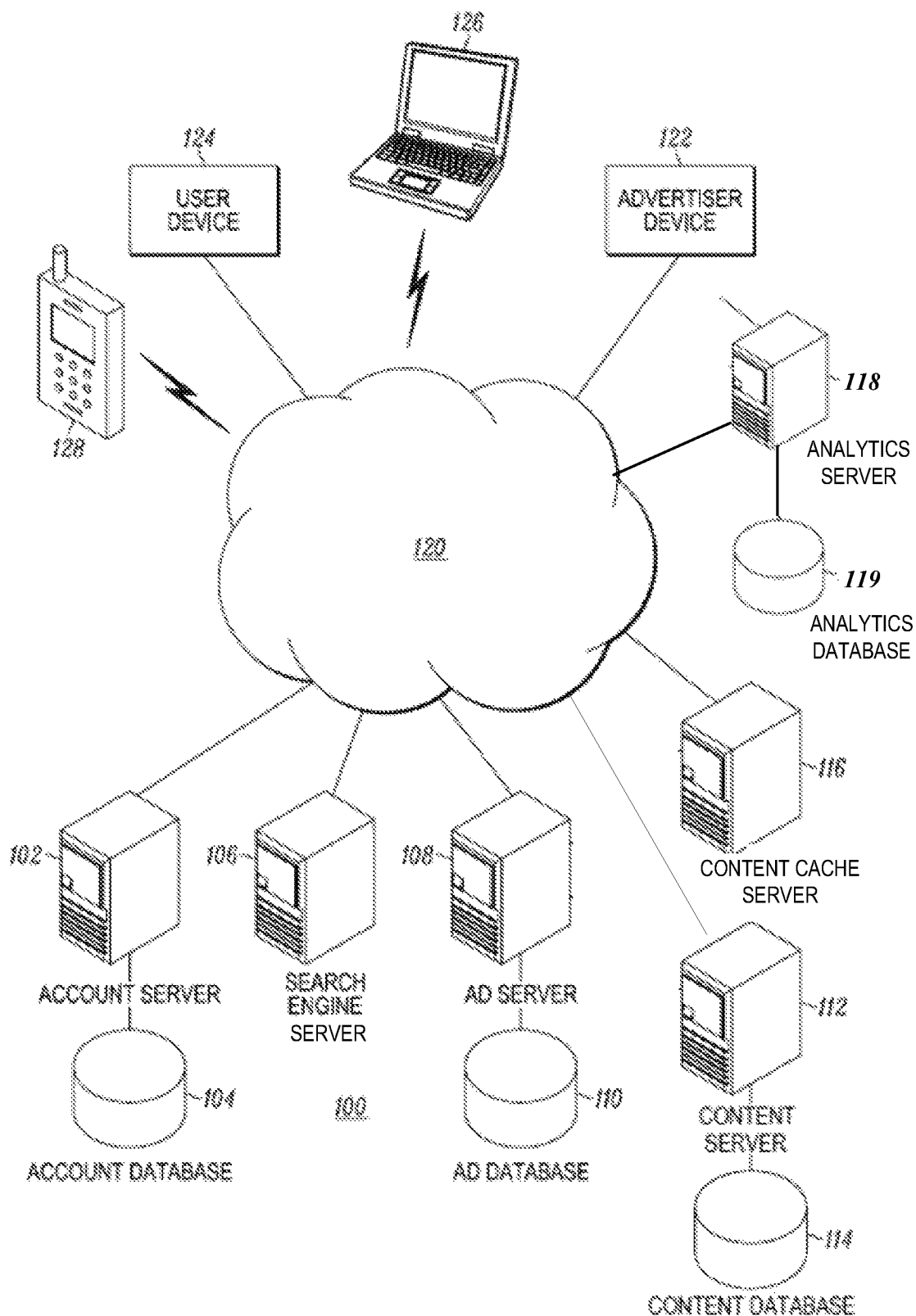
FIG. 1 illustrates a block diagram of an example information system that includes example devices of a network that can communicatively couple with an example system that performs client-side compression of data for communication to a server.

FIG. 1 illustrates a block diagram of an example information system that includes example devices of a network communicatively coupled with an example system that performs client-side compression of data for communication to a server, such as for analysis. The information system 100 in the example of FIG. 1 includes an account server 102, an account database 104, a search engine server 106, an ad server 108, an ad database 110, a content database 114, a content server 112, a content cache server 116, an analytics server 118, and an analytics database 119. The aforementioned servers and databases can be communicatively coupled over a network 120.

The information system 100 may be accessible over the network 120 by one or more advertiser devices, such as advertiser device 122 and by one or more user devices, such as user device 124. In various examples of such an online information system, users may search for and obtain content from sources over the network 120, such as obtaining content from the search engine server 106, the ad server 108, the ad database 110, the content database 114, the content server 112, and the content cache server 116. Advertisers may provide advertisements for placement on electronic properties, such as web pages, and other communications sent over the network to user devices, such as the user device 124. The online information system can be deployed and operated by an online provider, such as Yahoo! Inc.

The account server 102 stores account information for advertisers. The account server 102 is in data communication with the account database 104. Account information may include one or more database records associated with each respective advertiser. Any suitable information may be stored, maintained, updated and read from the account database 104 by the account management server 102. Examples include advertiser identification information, advertiser security information, such as passwords and other security credentials, account balance information, and information that was compressed related to content associated with their ads and user interactions with their ads and associated content. Also, examples include analytics data related to their ads and associated content and user interactions with the aforementioned.

The account server 102 may be implemented using any suitable device. The account management server 102 may be implemented as a single server, a plurality of servers, or any other type of computing device known in the art. Access to the account server 102 can be accomplished through a firewall which protects the account management programs and the account information from external tampering. Additional security may be provided via enhancements to the standard communications protocols, such as Secure HTTP (HTTPS) or the Secure Sockets Layer (SSL). Such security may be applied to the servers of FIG. 1, for example.

The account server 102 may provide an advertiser front end to simplify the process of accessing the account information of an advertiser. The advertiser front end may be a program, application, or software routine that forms a user interface. In a particular example, the advertiser front end is accessible as a website with one or more electronic properties that an accessing advertiser may view on an advertiser device, such as advertiser device 122. The advertiser may view and edit account data and advertisement data using the advertiser front end. After editing the advertising data, the account data may then be saved to the account database 104.

The search engine server 106 may be a computer system, one or more servers, or any other computing device known in the art. Alternatively, the search engine server 106 may be a computer program, instructions, or software code stored on a computer-readable storage medium that runs on a processor of a single server, a plurality of servers, or any other type of computing device known in the art. The search engine server 106 may be accessed by user devices, such as the user device 124 operated by a user over the network 120.

The user device 124 communicates a user query to the search engine server 106. The search engine server 106 locates matching information using any suitable protocol or algorithm and returns information to the user device 124. The search engine server 106 may be designed to help users find information located on the Internet or an intranet. In an example, the search engine server 106 may also provide to the user device 124 over the network 120 an electronic property, such as a web page, with content, including search results, information matching the context of a user inquiry, links to other network destinations, or information and files of information of interest to a user operating the user device 124, as well as a stream or web page of content items and advertisement items selected for display to the user. The aforementioned information provided by the search engine server 106 may be part of the scanned, built, tracked, serialized, encoded, compressed, and/or communicated data described herein.

The search engine server 106 may enable a device, such as the user device 124 or any other client device, to search for files of interest using a search query. Typically, the search engine server 106 may be accessed by a client device via one or more servers or directly over the network 120. The search engine server 106 may include a crawler component, an indexer component, an index storage component, a search component, a ranking component, a cache, a profile storage component, a logon component, a profile builder, and one or more application program interfaces (APIs). The search engine server 106 may be deployed in a distributed manner, such as via a set of distributed servers, for example. Components may be duplicated within a network, such as for redundancy or better access.

The ad server 108 operates to serve advertisements to user devices, such as the user device 124. Advertisements include data defining advertisement information that may be of interest to a user of a user device. An advertisement may include text data, graphic data, image data, video data, or audio data. An advertisement may further include data defining one or more links to other network resources providing such data. The other locations may be other locations on the internet, other locations on an intranet operated by the advertiser, or any access. The aforementioned targeting data may be part of the scanned, built, tracked, serialized, encode, compressed, and/or communicated data described herein. The aforementioned ads provided by the ad server 108 may be part of the scanned, built, tracked, serialized, encoded, compressed, and/or communicated data described herein.

For online information providers, advertisements may be displayed on electronic properties resulting from a user-defined search based, at least in part, upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. The aforementioned targeting data may be part of the scanned, built, tracked, serialized, encoded, compressed, and/or communicated data described herein.

One approach to presenting targeted advertisements includes employing demographic characteristics (e.g., age, income, sex, occupation, etc.) for predicting user behavior, such as by group. Advertisements may be presented to users in a targeted audience based, at least in part, upon predicted user behavior. The aforementioned targeting data may be part of the scanned, built, tracked, serialized, encoded, compressed, and/or communicated data described herein.

Another approach includes profile-type ad targeting. In this approach, user profiles specific to a user may be generated to model user behavior, for example, by tracking a user's path through a website or network of sites, and compiling a profile based, at least in part, on pages or advertisements ultimately delivered. A correlation may be identified, such as for user purchases, for example. An identified correlation may be used to target potential purchasers by targeting content or advertisements to particular users. The aforementioned targeting data may be part of the scanned, built, tracked, encoded, serialized, compressed, and/or communicated data described herein.

Yet another approach includes targeting based on content of an electronic property requested by a user. Advertisements may be placed on an electronic property or in association with other content that is related to the subject of the advertisements. The relationship between the content and the advertisement may be determined in any suitable manner. The overall theme of a particular electronic property may be ascertained, for example, by analyzing the content presented therein. Moreover, techniques have been developed for displaying advertisements geared to the particular section of the article currently being viewed by the user. Accordingly, an advertisement may be selected by matching keywords, and/or phrases within the advertisement and the electronic property. The aforementioned targeting data may be part of the scanned, built, tracked, serialized, encoded, compressed, and/or communicated data described herein.

The ad server 108 includes logic and data operative to format the advertisement data for communication to the user device. The ad server 108 is in data communication with the ad database 110. The ad database 110 stores information, including data defining advertisements, to be served to user devices. This advertisement data may be stored in the ad database 110 by another data processing device or by an advertiser. The advertising data may include data defining advertisement creatives and bid amounts for respective advertisements. The aforementioned ad formatting and pricing data may be part of the scanned, built, tracked, serialized, encoded, compressed, and/or communicated data described herein.

The advertising data may be formatted to an advertising item that may be included in a stream of content items and advertising items provided to a user device. The formatted advertising items can be specified by appearance, size, shape, text formatting, graphics formatting and included information, which may be standardized to provide a consistent look for advertising items in the stream.

Further, the ad server 108 is in data communication with the network 120. The ad server 108 communicates ad data and other information to devices over the network 120. This information may include advertisement data communicated to a user device. This information may also include advertisement data and other information communicated with an advertiser device, such as the advertiser device 122. An advertiser operating an advertiser device may access the ad server 108 over the network to access information, including advertisement data. This access may include developing advertisement creatives, editing advertisement data, deleting advertisement data, setting and adjusting bid amounts and other activities. The ad server 108 then provides the ad items to other network devices, such as the content cache server 116.

The ad server 108 may provide an advertiser front end to simplify the process of accessing the advertising data of an advertiser. The advertiser front end may be a program, application or software routine that forms a user interface. In one particular example, the advertiser front end is accessible as a website with one or more electronic properties that an accessing advertiser may view on the advertiser device. The advertiser may view and edit advertising data using the advertiser front end. After editing the advertising data, the advertising data may then be saved to the ad database 110 for subsequent communication in advertisements to a user device.

The ad server 108 may be a computer system, one or more servers, or any other computing device known in the art. Alternatively, the ad server 108 may be a computer program, instructions, and/or software code stored on a computer-readable storage medium that runs on a processor of a single server, a plurality of servers, or any other type of computing device known in the art.

The content server 112 and the content cache server 116 may access information about content items either from the content database 114 or from another location accessible over the network 120. The content server 112 and the content cache server 116 communicate data defining content items and other information to devices over the network 120. For example, the content cache server 116 can communicate hyperlinks from a queue in the content cache server 116, where the hyperlinks include addresses to served content, such as content served from the content server 112 or another content source. These hyperlinks can link to the content provided in the streams described herein for example. In general, the information about content items may include any type of content data communicated to a user device.

The information about content items may also include content data and other information communicated by a content provider operating a content provider device. A content provider operating a content provider device may access the content server 112 or the content cache server 116 over the network 120 to access information, including content data. This access may be for developing content items, editing content items, deleting content items, setting and adjusting bid amounts and other activities.

The content server 112 or the content cache server 116 may provide a content provider front end to simplify the process of accessing the content data of a content provider. The content provider front end may be a program, application or software routine that forms a user interface. In a particular example, the content provider front end is accessible as a website with one or more electronic properties that an accessing content provider may view on the content provider device. The content provider may view and edit content data using the content provider front end. After editing the content data, such as at the content server 112 or another source of content, the content data may then be saved to the content database 114 or the content cache server 116 for subsequent communication to a user device. In an example, the content cache server 116 is dedicated to caching, such as through a queue and/or a stack, content and content data for subsequent communication to a user device, such as client device 301 of FIG. 3.

The content server 112 or the content cache server 116 includes logic and data operative to format content data and other information for communication to the user device. The content server 112 or the content cache server 116 can also provide the content items to other network devices. The content server 112 can provide content items or links to such items to the content cache server 116 that eventually serves the items to a user device, such as the client device 301 of FIG. 3.

The content data may be formatted to a content item that may be included in a stream of content items and advertisement items provided to a user device. The formatted content items can be specified by appearance, size, shape, text formatting, graphics formatting and included information, which may be standardized to provide a consistent look for content items in the stream.

In an example, the content items have an associate bid amount that may be used for ranking or positioning the content items in a stream of items presented to a user device. In other examples, the content items do not include a bid amount, or the bid amount is not used for ranking the content items. Such content items may be considered non-revenue generating items.

The content server 112 and/or the content cache server 116 can include logic and data operative to format content data and other information for communication to the user device. The content server 112 and/or the content cache server 116 then can provide the content items to other network devices, such as the ad server 108.

The content cache server 116 can be one of a plurality of content cache servers distributed geographically to facilitate faster retrieval of data. For example, a user device, such as the client device 301, may receive content data from the most geographical proximate content cache server or the next most geographical proximate content cache server if the most proximate one is busier. In other words, the content cache server used can depend on a determination of which content cache server should provide the data the fastest to the requesting user device. This determination can be according to traffic occurring at or associated with the server, and/or geographical proximity to the requesting user device. Also, in an example, various shortcuts can be utilized to determine traffic associated with a server or the most geographical proximate server. For example, a smart Domain Name System (DNS) can be used to determine the closest content cache server. Also, in one example, to facilitate speed of content data delivery, the content data can be stored in RAM of the content cache server 116 and served via a lightweight proxy server, such as a lightweight proxy server implemented via an Apache server.

The aforementioned servers and databases may be implemented through any suitable computing device. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

The aforementioned servers and databases may be implemented as online server systems or may be in communication with online server systems. An online server system may include a device that includes a configuration to provide data via a network to another device including in response to received requests for page views or other forms of content delivery. An online server system may, for example, host a site, such as a social networking site, examples of which may include, without limitation, Flicker, Twitter, Facebook, LinkedIn, or a personal user site (such as a blog, vlog, online dating site, etc.). An online server system may also host a variety of other sites, including, but not limited to business sites, educational sites, dictionary sites, encyclopedia sites, wikis, financial sites, government sites, etc.

An online server system may further provide a variety of services that may include web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may or may not be under common ownership or control with the servers and databases described herein.

The network 120 may include any data communication network or combination of networks. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network, such as the network 120.

Various types of devices may be made available to provide an interoperable capability for differing architectures or protocols. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links, including satellite links, or other communication links or channels, such as may be known to those skilled in the art. Furthermore, a computing device or other related electronic devices may be remotely coupled to a network, such as via a telephone line or link, for example.

The advertiser device 122 includes any data processing device that may access the information system 100 over the network 120. The advertiser device 122 is operative to interact over the network 120 with any of the servers or databases described herein. The advertiser device 122 may implement a client-side application, such as a web browser, for viewing electronic properties and submitting user requests. The advertiser device 122 may communicate data to the information system 100, including data defining electronic properties and other information. The advertiser device 122 may receive communications from the information system 100, including data defining electronic properties and advertising creatives.

In an example, content providers may access the information system 100 with content provider devices that are generally analogous to the advertiser devices in structure and function. The content provider devices provide access to content data in the content database 114, for example.

The user device 124 includes any data processing device that may access the information system 100 over the network 120. The user device 124 is operative to interact over the network 120 with the search engine server 106, the ad server 108, the content server 112, the content cache server 116, and the analytics server 118. The user device 124 may implement a client-side application, such as a web browser, for viewing electronic content and submitting user requests. A user operating the user device 124 may enter a search request and communicate the search request to the information system 100. The search request is processed by the search engine and search results are returned to the user device 124.

In other examples, a user of the user device 124 may request data, such as a page of information from the online information system 100. The data instead may be provided in another environment, such as a native mobile application, TV application, or an audio application. The online information system 100 may provide the data or re-direct the browser to another source of the data. In addition, the ad server may select advertisements from the ad database 110 and include data defining the advertisements in the provided data to the user device 124.

The advertiser device 122 and the user device 124 operate as a client device when accessing information on the information system 100. A client device, such as the advertiser device 122 and the user device 124 may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. In the example of FIG. 1, both laptop computer 126 and smartphone 128, which can be client devices, may be operated as either an advertiser device or a user device.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device, such as the advertiser device 122 and the user device 124, may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally or remotely stored or streamed video, or games. The foregoing is provided to illustrate that claimed subject matter is intended to include a wide range of possible features or capabilities. At least some of the features, capabilities, and interactions with the aforementioned may be tracked, serialized, encoded, compressed, and communicated to a relevant server, by respective processes described herein.

Also, the disclosed methods and systems may be implemented at least partially in a cloud-computing environment, at least partially in a server, at least partially in a client device, or in a combination thereof.

Figure 2:
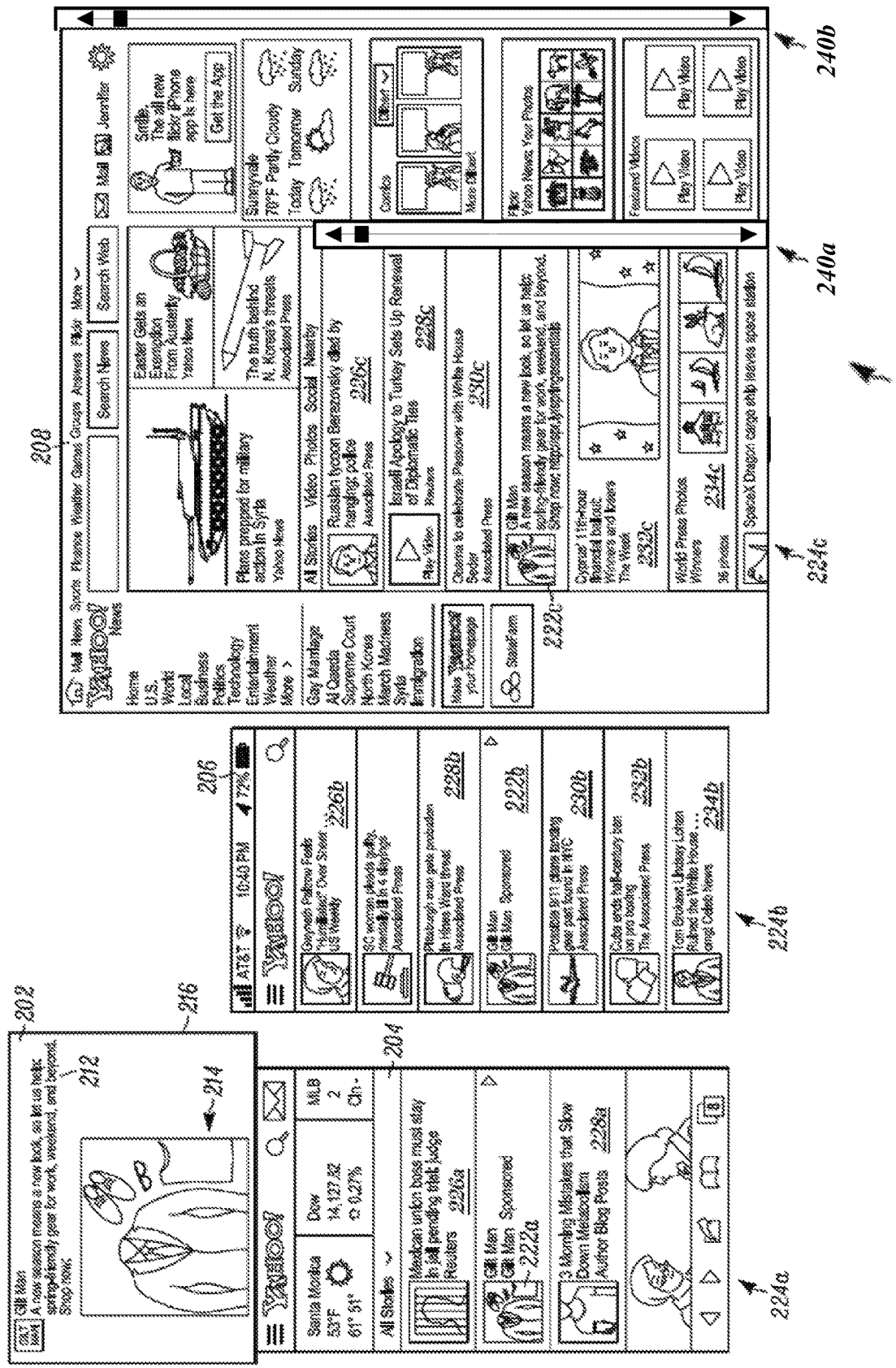
FIG. 2 illustrates originally and newly displayed ad items and content items of example screens rendered by client-side applications within a session of each of the client-side applications, such as original graphical items and new graphical items streamed on a page view of a client-side application, such as a web browser, within a session of the client-side application.

FIG. 2 illustrates originally and newly displayed ad items and content items of example screens rendered by client-side applications within a session of each of the client-side applications, such as original graphical items and new graphical items streamed on a page view of a client-side application, such as a web browser, within a session of the client-side application. The content items and ad items displayed may be provided by the search engine server 106, the ad server 108, the content server 112, or the content cache server 116 of FIG. 1.

In FIG. 2, a display ad 202 is illustrated as displayed on a variety of displays including a mobile web device display 204, a mobile application display 206 and a personal computer display 208. The mobile web device display 204 may be shown on the display screen of a mobile handheld device, such as a smartphone. The mobile application display 206 may be shown on the display screen of a portable device, such as a tablet computer. The personal computer display 208 may be displayed on the display screen of a personal computer (PC).

The display ad 202 is shown in FIG. 2 formatted for display on a user device but not as part of a stream to illustrate an example of the contents of such a display ad. The display ad 202 includes text 212, graphic images 214 and a defined boundary 216. The display ad 202 can be developed by an advertiser for placement on an electronic property, such as a web page, sent to a user device operated by a user. The display ad 202 may be placed in a wide variety of locations on the electronic property. The defined boundary 216 and the shape of the display ad can be matched to a space available on an electronic property. If the space available has the wrong shape or size, the display ad 202 may not be useable.

To overcome these requirements and limitations, the display ad 202 may be reformatted or alternately formatted for inclusion in a stream of content items and advertising items including a stream ad incorporating contents of the display ad 202. The aforementioned reformatting or the alternative formatting for inclusion in a stream may occur at the content cache server 116 and/or the content server 112. For example, the reformatting or the alternative formatting for inclusion in a stream may occur at the content server 112, but the results of these activities may be cached and/or refined at the content cache server 116.

In these examples, the display ad is shown as a part of streams 224a, 224b, and 224c. The streams 224a, 224b, and 224c include a sequence of items displayed, one item after another, for example, down an electronic property viewed on the mobile web device display 204, the mobile application display 206 and the personal computer display 208. The streams 224a, 224b, and 224c may include any type of items. In the illustrated example, the streams 224a, 224b, and 224c include content items and advertising items. For example, stream 224a includes content items 226a and 228a along with advertising item 222a; stream 224b includes content items 226b, 228b, 230b, 232b, 234b and advertising item 222b; and stream 224c includes content items 226c, 228c, 230c, 232c and 234c and advertising item 222c. With respect to FIG. 2, the content items can be items published by non-advertisers. However, these content items may include advertising components. Each of the streams 224a, 224b, and 224c may include any number of content items and advertising items.

In an example, the streams 224a, 224b, and 224c may be arranged to appear to the user to be an endless sequence of items, so that as a user, of a user device on which one of the streams 224a, 224b, or 224c is displayed, scrolls the display, a seemingly endless sequence of items appears in the displayed stream. The scrolling can occur via the scroll bars 240a and 240b, for example, or by other known manipulations, such as a user dragging his or her finger downward or upward over a touch screen displaying the streams 224a, 224b, or 224c.

To enhance the apparent endless sequence of items so that the items display quicker from manipulations by the user, the items can be cached by a local cache and/or a remote cache associated with the client-side application or the page view, such as a remote cache embedded in the content cache server 116. Such caches may include a queue or a stack for storing the content items or links to the content items.

The content items positioned in any of streams 224a, 224b, and 224c may include news items, business-related items, sports-related items, etc. Further, in addition to textual or graphical content, the content items of any stream may include other data as well, such as audio and video data or applications. Each content item may include text, graphics, other data, and a link to additional information. Clicking or otherwise selecting the link re-directs the browser on the user's device to an electronic property referred to as a landing page that contains the additional information. The clicking or otherwise selecting of the link, the re-direction to the landing page, the landing page, and the additional information, for example, can each be tracked, and then the data associated with the tracking can be serialized, encoded, compressed, and communicated to a relevant server, such as the analytics server 118 or the account server 102. Once received by the relevant server, the compressed data can be decompressed and decoded into the serialized data. Also, the serialized data can be reverse processed into or near its original state. For example, the analytics server can receive batched scanned, serialized, encoded, and compressed data associated with one or more streams of a page view, and reverse these processes to derive the data to its original state or near original state. This derived data can then be used for analytics and other uses.

Stream ads like the advertising items 222a, 222b, and 222c may be inserted into the stream of content, supplementing the sequence of related items, providing a more seamless experience for end users. Similar to content items, the advertising items may include textual or graphical content as well as other data, such as audio and video data or applications. Each advertising item 222a, 222b, and 222c may include text, graphics, other data, and a link to additional information. Clicking or otherwise selecting the link re-directs the browser on the user's device to an electronic property referred to as a landing page. The clicking or otherwise selecting of the link, the re-direction to the landing page, the landing page, and the additional information, for example, can each be tracked, and then the data associated with the tracking can be serialized, encoded, compressed, and communicated to a relevant server, such as the analytics server 118 or the account server 102.

While the example streams 224a, 224b, and 224c are shown with a single visible advertising item 222a, 222b, and 222c, respectively, any number of advertising items may be included in a stream of items. Also, the advertising items may be slotted within the content, such as slotted the same for all users or slotted based on personalization or grouping, such as grouping by audience members or content. Adjustments of the slotting may be according to various dimensions and algorithms. This concept of slotting is just one of many Internet marketing strategies that can be optimized by the system 300 of FIG. 3 or one of the other systems, modules, or operations described herein, such as the operations illustrated by FIGS. 4-9.

Figure 3:
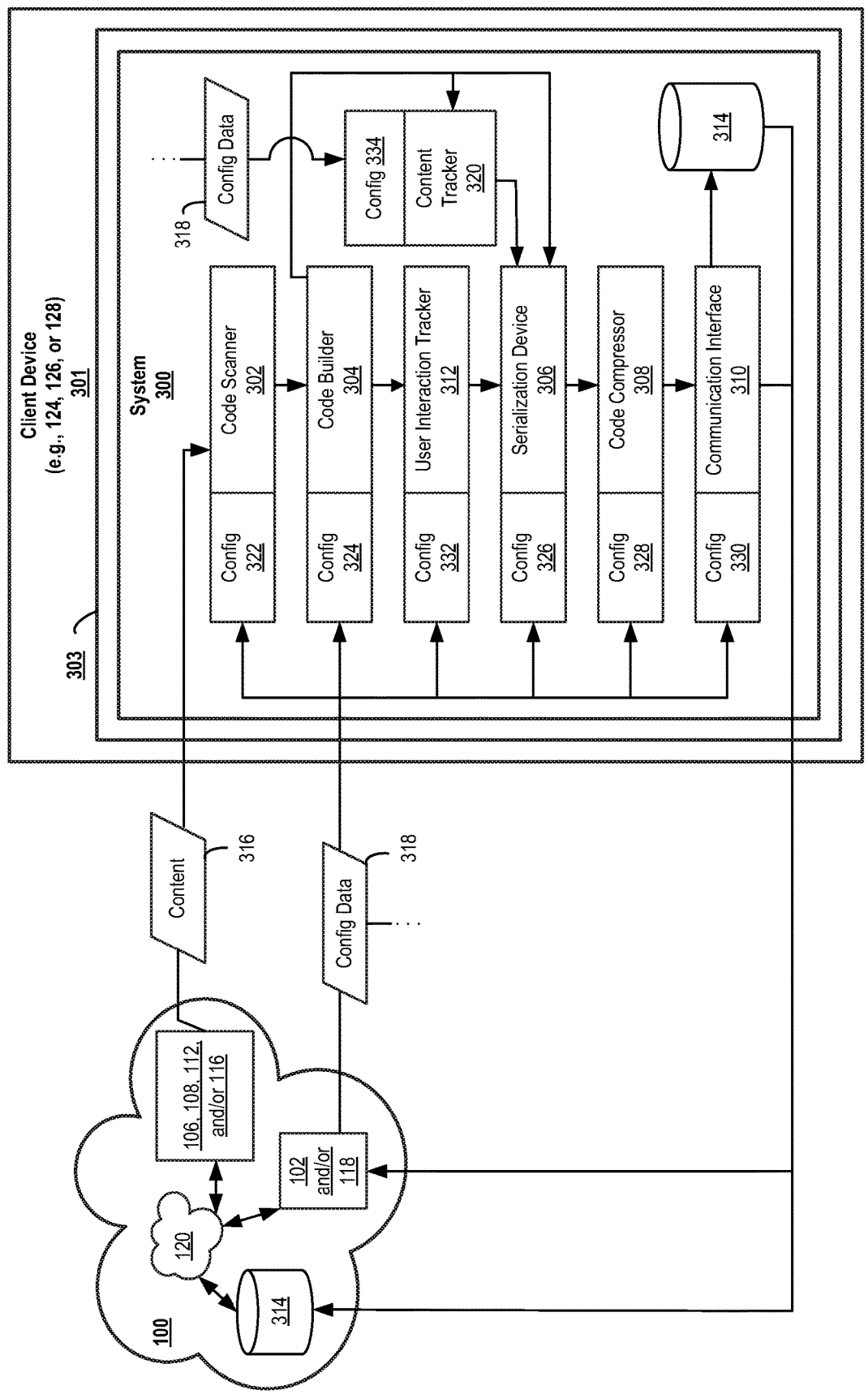
FIG. 3 illustrates a block diagram of the example information system of FIG. 1 (information system 100) interacting with an example system that performs client-side compression of data for communication to a server (system 300), such as an analytics server.

FIG. 3 illustrates a block diagram of the example information system of FIG. 1 (information system 100) interacting with an example system that performs client-side compression of data for web analytics (the system 300). For example, FIG. 3 illustrates the system 300 that enables communication of a maximum amount of data over a minimal amount of packets to the account server 102 and/or the analytics server 118, via content scanning, content model building, content and user interaction tracking, data serializing, data encoding, and/or data compressing. In an example, the system 300 enables the uploading of a maximum amount of data from a client device 301 (e.g., user devices 124, 126, or 128) to a server device, such as a service device connected to the client device through the network 120 of information system 100. Considering the growing amount of content and data rendered and tracked via a web application, limited bandwidth, and growing demand for speed, it can be especially useful to have such a system that can upload large amounts of data per packet via data compression.

As illustrated, system 300 is hosted on the client device 301. However, any one or more of the depicted aspects of the system 300 may be hosted on a device external to the client device 301. Also, as illustrated, the system 300 is hosted via a client-side application 303, such as a web browser, hosted on the client device 301. However, any one or more of the depicted aspects of the system 300 may be without a host application or hosted by another application besides the client-side application 303.

System 300 includes a code scanner 302, a code builder 304, a serialization device 306, a code compressor 308, and a communication interface 310. The system 300 also includes a user interaction tracker 312 and a content tracker 320. The code scanner 302 is at least communicatively coupled to the code builder 304 and one or more content sources (e.g., the content cache server 116, the content server 112, the ad server 108, and the search server 106 of FIG. 1).

Content 316 to be scanned by the code scanner 302, can be provided via a page view of an electronic property (such as a web page view), streaming audio and/or video of a media player, any other form of electronic content delivery, or any combination thereof. This application, for the most part, describes interactions with page views for convenience. However, the example aspects of the system 300 and other systems and methods described herein can interact with streaming audio and/or video of a media player, any other form of electronic content delivery, or any combination thereof.

Such content can be communicated from the content source(s) to the client device 301 via the network 120. Then once the content 316 is received by the client device 301, the code scanner 302 can scan at least part of the content 316. Content, such as the content 316, can be any electronic form of content configured to be presented through one or more of display, speaker, or any of other user interface device. For example, the content 316 can include one or more of audio, visual, tactile, or any other form of human-perceivable information.

Where at least part of the content 316 is within a page view and where source code of at least that part of the page view is available, the code scanner 302 can scan the source code to identify objects of the source code. Where the source code includes one or more documents, such as source code including HTML and/or XML, the code scanner can use a computer program, such as a DOM script, to search through and identify objects of a document object model (DOM) of the one or more documents of the source code. The DOM is a cross-platform and language-independent convention for representing and interacting with objects in HTML and XML documents, for example. A DOM script can include scripting computer languages, such as JAVASCRIPT and PHP, which can interact with the DOM in various ways.

DOM scripts, other client-side application scripts, applets, other software, analogous firmware, analogous computer hardware, or any combination thereof can be used to implement the code scanner 302, the code builder 304, the trackers 312 and 320, the serialization device 306, the code compressor 308, and the communication interface 310.

Referring back to the structure of the system 300, the code builder 304 is at least communicatively coupled to the code scanner 302 and the serialization device 306. The code scanner 302 can also be communicatively coupled to the user interaction tracker 312 and the content tracker 320. The user interaction tracker 312 is also at least communicatively coupled to the code builder 304 and the serialization device 306. The content tracker 320 is at least communicatively coupled to the code builder 304 and the serialization device 306 too. The serialization device 306 is at least communicatively coupled to the code compressor 308, the code builder 304, the user interaction tracker 312 and the content tracker 320. The code compressor 308 is at least communicatively coupled to at least the serialization device 306 and the communication interface 310. The aforementioned couplings may be direct couplings or may be couplings via an intermediary device. Each of the aforementioned components of the system 300 may be directly or indirectly communicatively coupled to each other. For example, the code compressor 308 and the serialization device 306 may be coupled via a code encoder.

The system 300 can also include respective configurators 322, 324, 326, 328, 330, 332, and 334 for the code scanner 302, the code builder 304, the serialization device 306, the code compressor 308, the communication interface 310, and the trackers 312 and 320. The respective configurators 322, 324, 326, 328, 330, 332, and 334 can configure the code scanner 302, the code builder 304, the serialization device 306, the code compressor 308, the communication interface 310, and the trackers 312 and 320 to perform their respective processes, on the fly, during a page view. A server associated with the system 300 that can be communicatively coupled to other associated servers, such as the account server 102 and the analytics server 118, can communicate configuration data 318 to the respective configurators 322, 324, 326, 328, 330, 332, and 334. On the fly configurations allows for a variety of complex features and interactions to take place without refreshing the page view or making a request to a server or device external to the client-side application 303, besides the content cache server 116, for example.

The system 300 can also include respective terminators (not depicted) for the code scanner 302, the code builder 304, the serialization device 306, the code compressor 308, the communication interface 310, the trackers 312 and 320, and any other components of the system 300. The respective terminators can terminate or at least interrupt operations performed by the code scanner 302, the code builder 304, the serialization device 306, the code compressor 308, the communication interface 310, and the trackers 312 and 320. The respective terminators can also completely terminate and remove the code scanner 302, the code builder 304, the serialization device 306, the code compressor 308, the communication interface 310, and the trackers 312 and 320 from a session of a page view or even an entire session of the client-side application 303. In an example, it may be required to run a respective terminator prior to reinitiating a component of the system, such in the event of reinitiating a component within a session.

Also, termination or interruption of these components or processes of these components can be executed, on the fly, during a page view or during a session of the client-side application 303. This allows for a variety of features and interactions to be immediately limited. For example, the respective terminators can be communicatively coupled to a security component, so that any operation of the system or component of the system can be terminated if it is infected or probable of being infected by a virus or some other form of corruption or security breach.

Figure 4:
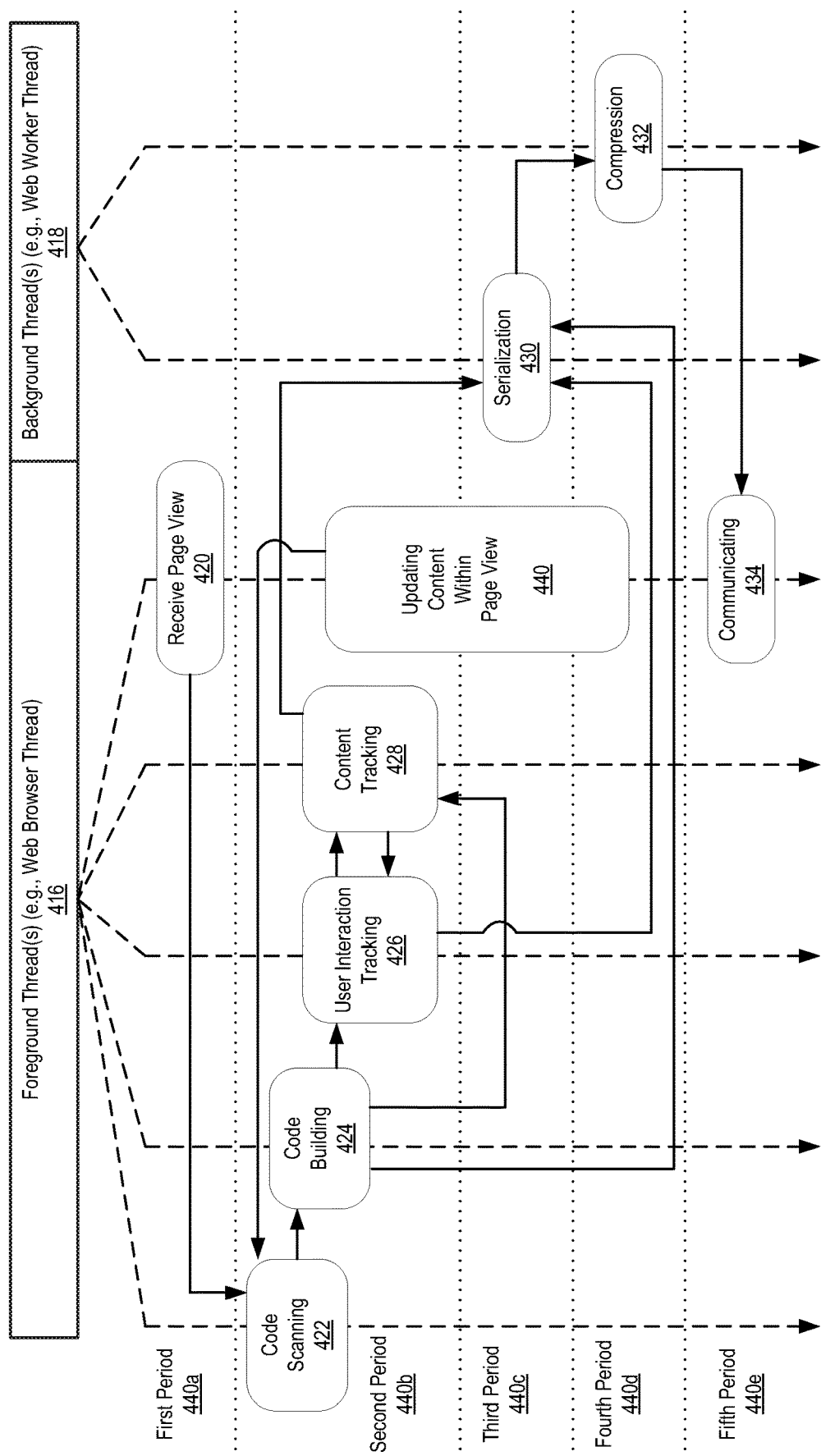
FIGS. 4-6 illustrate example operations performed by example systems that can perform client-side compression of data for communication to a server (such as the system 300 of FIG. 3).
Figure 5:
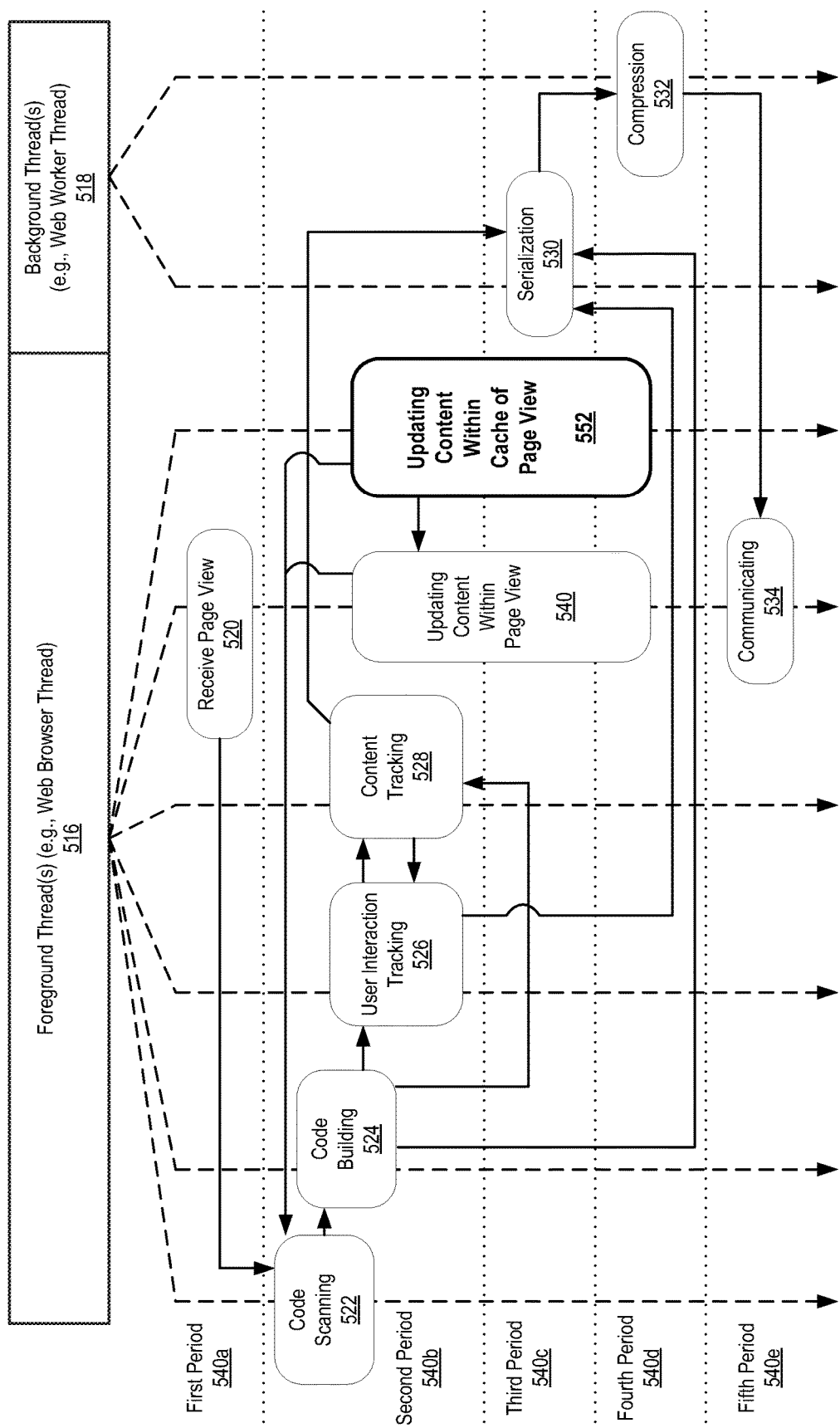
Figure 6:
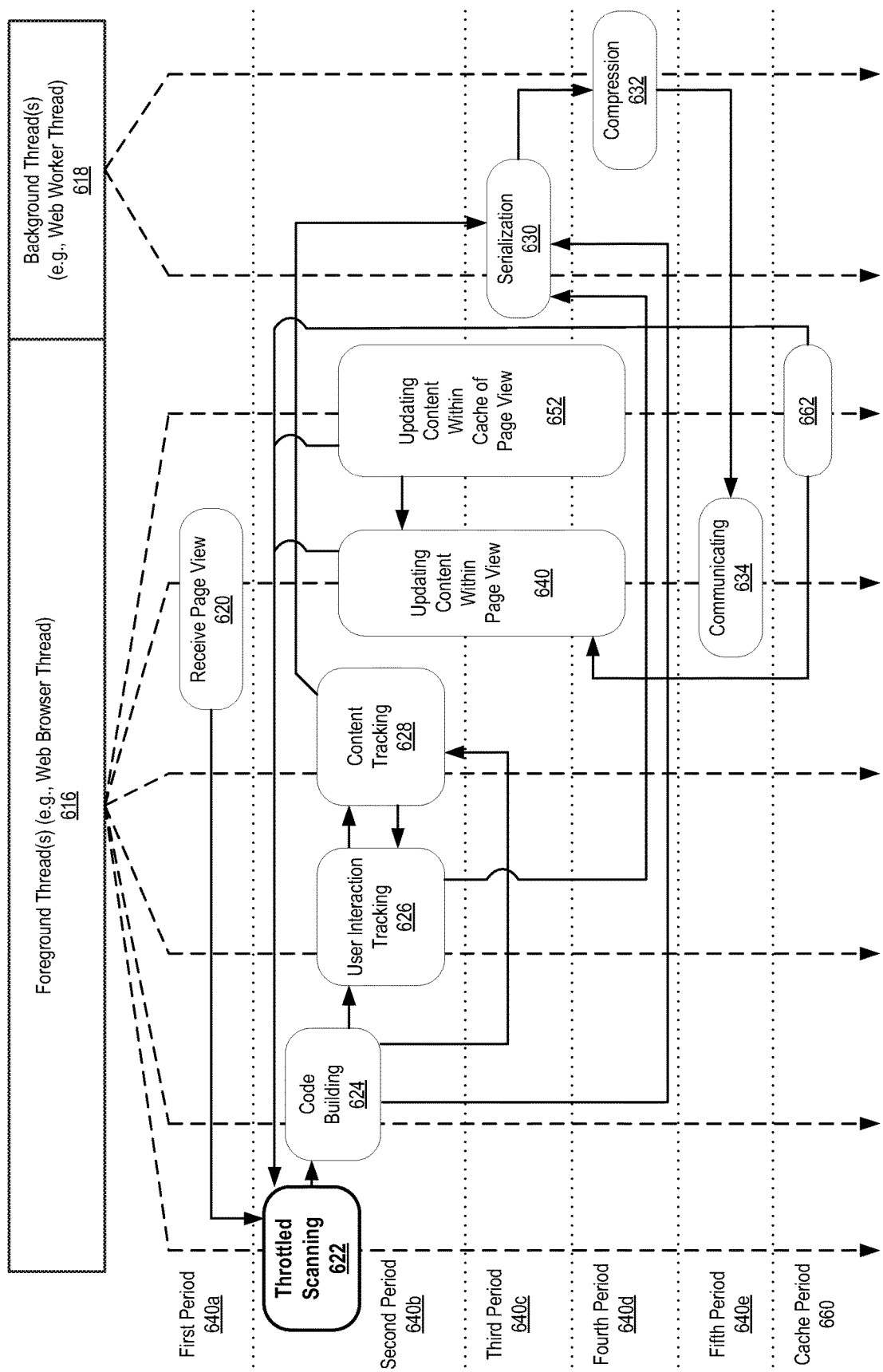

In an example, the code scanner 302 can be configured to run code scanning processes (e.g., code scans 422, 522, and 622 illustrated in FIGS. 4-6 respectively) on a thread, such as a foreground thread of the client-side application 303 (e.g., foreground thread(s) 416, 516, and 616, illustrated in FIGS. 4-6 respectively). A trigger, such as a communication from a remote control server or local controller, may initiate the scanning by the code scanner 302. The trigger may be the receiving of an indication of one or more sections of an electronic property to be tracked, such as via a HTTP or a HTTPS request to track the electronic property.

The code scanner 302, within the scanning processes, via the thread, can be configured to receive an indication of one or more sections of the content 316 to be tracked. Also, the code scanner 302, within the scanning processes, via the thread, can be configured to scan a structure and/or organization of the content 316, such as scan at least part of a DOM of an electronic property, such as a DOM of a web page. The code scanner 302 can be configured to scan a structure and/or organization of the content 316 within at least one of the one or more the sections of the content. In an example, the one or more sections of the content 316 are source code blocks associated with the content. For example, the source code blocks may be source code blocks of an electronic property.

The code scanner 302, within the scanning processes, can also be configured to identify one or more anchors according to the scanned sections of the content 316. For example, the code scanner 302 can be configured to identify one or more anchors according to the scanned structure and/or organization of the content 316, such as according to the scanned at least part of a DOM of an electronic property. Anchors can include text that identifies parts of a page view, links to elements of a page view or to other content, or links to computer programs associated with the page view. In an example, these links may be HTML or XML hyperlinks. Anchors can come in other forms besides text of source code, and can provide other functionality not specified herein.

The anchors and the types of anchors may be standard or customized, such as customized to an electronic property hosting the content 316. Customization can occur through a code section or a configuration object accompanying the content 316 communicated from the content source or from a control part of the system, such as a control server. The configuration code can also include a debug component, for debugging the scanning, logging, and possibly the eventual build and organization of the logged data. The configuration code or object can be automatically and/or manually created.

In an example, the code scanner can be configured to automatically determine, via machine learning for example, which sections of the content 316 is to be scanned. For example, it can be determined which link views in a listing of content can be scanned. As the scanning occurs, the code scanner may log respective data in a data structure, such as an array. In an example, the code scanner can automatically log link views associated with determined or selected anchors and/or sections. Sections and anchors can be selected for scanning via key-value pairs in a list, such as an array data structure. The list of pairs may be multi-dimensional so that relationships between the pairs may be identified, for example. The key-value pairs may represent various instances of notations representing sectional divisions, paragraphs, and other aspects of content, such as structural elements of source code of an electronic property.

In the logging of the content 316, which may occur within the scanning processes, various open source and/or proprietary libraries may be utilized. For example, the scanning and logging may use libraries specific to tracking various audio and/or visual presentation of electronic content, various parameters associated with the client-side application, and various types of user interactions. Also, a library may be used that is specific to tracking user interaction data associated with browsing of electronic content. Eventually, the scanned and tracked components of and actions associated with the content 316 and/or the client-side application can be used by an analytics systems for various purposes.

In an example, various features, dimensions, and/or parameters of a client-side application, such as a web browser, can be tracked. This can be done one a per-session basis. This tracked information can be associated with a user and can represent a fingerprint of the user with respect to that user's use of the client-side application on the Internet. For example, the system 300 can track a user by tracking a user's unique setup on his or her client-side applications. For example, a user's web browser can have a unique arrangement of features, which can be tracked. For example, a unique arrangement of web browser plugins installed, screen size preferred, accepted HTTP headers, mime types, and/or fonts installed can be tracked.

Besides being selective with respect to structure of the content 316, the scanning may be focused according to the analytics to be run on the scanned and logged data. Also, scans may be run separately in batches according to batch processes for different analytics purposes. The individual batch scans then may be compartmentalized by separate serializations and compressions. For example, a compressed file maybe sent in a packet per focused scan.

The code builder 304, within code building processes (e.g., code building 424, 524, or 624 illustrated in FIGS. 4-6 respectively), may organize logged data in multi-dimensional data structures that provides relationship data between parts of the content 316. This can be especially useful for the focused scans. Also, the code builder 304, within the code building processes, can identify and mark relationships between separate focused scans. This can be especially useful in batch processing of scans (such as illustrated at 810 in FIG. 8).

In an example, the code builder 304 can be configured to run the code building processes on a thread, such as a foreground thread of the client-side application 303 (e.g., foreground thread(s) 416, 516, and 616, illustrated in FIGS. 4-6 respectively). The code builder 304, within the code building processes, via the thread, can be configured to build a hierarchical representation of at least part of the one or more sections and/or the one or more identified anchors.

Also, in an example, the user interaction tracker 312 can be configured to run user interaction tracking processes (e.g., user interaction tracking 426, 526, or 626 illustrated in FIGS. 4-6 respectively) on a thread, such as a foreground thread of the client-side application 303 (e.g., foreground thread(s) 416, 516, and 616, illustrated in FIGS. 4-6 respectively). The user interaction tracker 312, within the user interaction tracking processes, via the thread, can be configured to track user interactions with user interface elements within at least part of the one or more sections of the content 316. User interactions can also be tracked via the structure and/or organization of the content 316, such as via a document object model (DOM) of an electronic property. User interactions can also be tracked via hierarchical representation of at least part of the one or more sections and/or the one or more identified anchors, such as the hierarchical representation built by the code builder 304. The user interaction tracker 312, within the user interaction tracking processes, via the thread, can also be configured to derive user interaction data from the tracked user interactions. The derived user interaction data may include one or more of link views, page views, clicks on aspects of the electronic property, and dwell times, for example.

User interaction data can also include various instances of scrolling through one or more page views or scrolling through one or more sections of a single page view. For example, user interaction data can include an amount of page views a user has scrolled through in a screen of a client-side application. In an example, the amount of page views a user has scrolled through in a screen can be determined according to an amount of pixels scrolled, in a direction, and the length of the screen in that direction. For example, if the height of the screen containing a first page view is 100 pixels, and a user has scrolled down 200 pixels, then that user has viewed three page views including the first page view.

Also, in an example, the content tracker 320 can be configured to run content tracking processes (e.g., content tracking 428, 528, or 628, illustrated in FIGS. 4-6 respectively) on a thread, such as a foreground thread of the client-side application 303 (e.g., foreground thread(s) 416, 516, and 616, illustrated in FIGS. 4-6 respectively). The content tracker 320, within the content tracking processes, via the thread, can be configured to the track updates in the content 316, whether the updates occur without refreshing a page view or without making a request to a device external to the client device 301 and/or the client-side application 303, beside making a request to a content cache server, such as the content cache server 116. For example, in the page view 242 of FIG. 2, content within the stream 224c initially appearing (e.g., content items 226c, 228c, and 230c) may update without refreshing the page view 242 or making a request to a device external to the client-side application 303 or the client device 301, besides a content cache server; and that update may be tracked by the content tracker 320.

The updates to the content 316 may also include dynamic or static changes to the content 316 or changes to the page view or changes to content within a media player that are independent of the content 316. For example, in the page view 242 of FIG. 2, content within the stream 224c appearing after a user interacts with scrollbar 240a (e.g., content items 232c and 234c) may be independent of the content 316 in that it comes from a different source than the content 316 and/or it is not associated with the content 316 besides that it is linked to the stream 224c; and that content appearing after the user interacts with scrollbar 240a may be tracked by the content tracker 320. New content appearing after user interaction with the client-side application 303, such as content items 232c and 234c of FIG. 2, that can be tracked by the content tracker 320, can be tracked upon presentation of the new content or upon being stored within a cache of the client-side application or the client device 301 prior to presentation or even a request of such content.

Updates to the content 316 can also be tracked via the structure and/or organization of the content, such as via a DOM of an electronic property. Updates to the content 316 can also be tracked via a hierarchical representation of at least part of the one or more sections and/or the one or more identified anchors, such as the hierarchical representation built by the code builder 304. The content tracker 320, within the content tracking processes, via the thread, can also be configured to derive content updates data from the tracked updates to the content 316.

In an example, the serialization device 306 can be configured to run data serialization processes (e.g., serialization 430, 530, or 630 illustrated in FIGS. 4-6 respectively) on a thread, such as a background thread of the client-side application 303 (e.g., background thread(s) 418, 518, and 618, illustrated in FIGS. 4-6 respectively). In another example, the serialization device 306 can be configured to run data serialization processes on a foreground thread of the client-side application 303.

The serialization device 306, within the serialization processes, via the thread, can be configured to serialize data derived from the hierarchical representation of the one or more sections and the one or more identified anchors. The serialization device 306, within the serialization processes, via the thread, can be also be configured to serialize data derived from the user interaction data.

The serialization device 306, within the serialization processes, via the thread, can also be configured to store the serialized data in memory, such as a local storage device or a local cache. In an example, the memory may be a part of the memory of the client device 301, such as being a part of memory 1010 of FIG. 10. The memory may be local with respect to the client-side application 303, an operating system hosting the client-side application 303, and/or a device hosting the client-side application 303. The serialization processes may include translating data structures and/or object state of the content 316 into a format that can be stored. The storage operations may include translating data structures and/or object state of the content 316 for storage in the memory, a file, and/or a buffer to the memory, and/or for transmission, such as via a packet, across a network channel.

The serialized data may be reconstructed subsequently in the same computer environment that it was serialized or another environment compatible with the serialization. The serialization can be used to create a semantically identical clone of original objects associated with the content 316, such as objects optimized by the code builder 304.

Complex objects, such as those with complex hierarchy and that make extensive use of references, may be serialize with modification to the original data objects being serialized. For example, where the serialization includes serialization of object-oriented objects, associated methods of the objects may not include associated methods inextricably linked.

To maintain the privacy and confidentiality, the serializations may use algorithms that encrypt the data as well. Once encrypted, serialized, and compressed, the data sent by the communication interface 310, may be secure; and once the data is received securely by its intended destination the data can be at least decrypted. The encryption and decryption can be implemented by any known or foreseeable technology compatible with the features described herein.

Also, the formats for serialization may be flexible. For example, the serialization device 306 may implement at least part of the serialization via a format for serialization using human-readable text to transmit data objects including attribute-value pairs (such as JAVASCRIPT OBJECT NOTATION (JSON)). Other formats may include encodings that are universal amongst standardize computer programming languages. Also, options that are more compact may be used, such as binary XML. Standard XML may be used as well. JSON can be advantageous because it is human readable like standard XML and lightweight similar to binary XML. JSON may be based on JAVASCRIPT syntax and/or other programming languages.

JSON can be a more lightweight plain-text alternative to XML, which is also commonly used for client-server communication in web applications. JSON can be based on JavaScript syntax and/or other programming languages. Also, "Yet Another Markup Language" (YAML) or a similar language may be used for the serialization. YAML may include features that improve the readability and compactness of the serialization over standard JSON. Features of the serialization format may include a notion of tagging data types, support for non-hierarchical data structures, an option to structure data with indentation, and forms of scalar data quoting. Additionally or alternatively, a property list format may be used in the serialization. Also, binary serialization may be used.

For at least the serialization processes, object-oriented programming languages may be utilized, such as Ruby, Smalltalk, Python, PHP, Objective-C, Java, and .NET languages. Also, scripts or applets may be used for at least instructing the serialization processes. Also, libraries may be added for serialization support for languages that lack native support for serialization.

In an example, the code compressor 308 can be configured to run code compressing processes (e.g., code compressions 432, 532, or 632 illustrated in FIGS. 4-6 respectively) on a thread, such as a background thread of the client-side application 303 (e.g., background thread(s) 418, 518, and 618, illustrated in FIGS. 4-6 respectively). The code compressor 308, within the compressing processes, via the thread, can be configured to compress the data serialized and/or stored by the serialization device 306.

The code compressor 308, within the compressing processes, may also be configured to encode the data received from the serialization device 306. For example, the code compressor 308 may use encoding schemes that represent binary data in an ASCII string format by translating it into a radix-64 representation, such as encoding the data to Base64.

The data compression performed by the code compressor 308, can include raw data compression, compression of source coding, and/or bit rate reduction. Bit rate reduction may include encoding data with fewer bits than the original data. The compression can be either lossy or lossless. Lossless compression reduces bits by identifying and reducing redundancy in the original data. No data is lost in ideal lossless compression. In an example, lossy compression can reduce bits by identifying unnecessary data, such as repetitive data, and removing the unnecessary data. The code compressor 308 can also use compressed sensing. Compressed sensing may include sampling of the original data and then compressing the sampled data. The sampling can vary depending on its purpose and resources allocated to the sampling.

A compression configurator 328, on the client-side or the server-side can be configured to manually or automatically adjust space-time complexity trade-off of the code compressor 308. Such configurations may occur within the compressing processes. The amount of resources dedicated to the compression versus the speed of compression can also be adjusted by the compression configurator 328. The configurator 328 can configure levels for the degree of compression, the amount of distortion introduced in lossy data compression, and the computational resources required to compress and decompress the data.

In an example, the code compressor 308, within the compressing processes, can compress data, such as client-side application data, content data, and user interaction data, so that the compressed data is compatible with operations of a cached model layer and data layer associated with the client-side application 303.

At least parts of the cached model layer and the data layer may be hosted on a server in communication with a device hosting the client-side application 303. The server hosting the cached parts of the model layer and the data layer can act as a cache of the client-side application 303. The server can also host multiple iterations of the cached layers associated with the client-side application 303, so that there are virtually separate caches for each session of the client-side application 303 across different devices hosting different instances of the client-side application 303. Besides the uploading processes described herein, the caching provided by such a server can bring great efficiencies to the delivery of content over a network, such as the Internet.

In an example, the communication interface 310 can be configured to run communication processes (e.g., communicating 434, 534, or 634 illustrated in FIGS. 4-6 respectively) on a thread, such as a foreground thread of the client-side application 303 (e.g., foreground thread(s) 416, 516, and 616, illustrated in FIGS. 4-6 respectively). The communication interface 310, within the communication processes, via the thread, can be configured to communicate to a server (such as the account server 102 and/or the analytics server 118), the data compressed by the code compressor 308. The communication interface 310 can be configured to communicate the compressed data and non-compressed data simultaneously to the server. Such communications can be asynchronous or synchronous, or a combination thereof.

In an example, the communication interface, within the communication processes, via the thread, can be configured to communicate the compressed data to a database 314 (or a web service that imitates a relational database), such as HTTP post the compressed data to one or more database tables associated with the system 300, the client-side application 303, the content 316, an account system (e.g., the account server 102 and the account database 104), and/or an analytics system (e.g., the analytics server 118 and the analytics database 119). The database 314 can be hosted on one or more servers. In an example, the database 314 can be hosted by the content cache server 116, the analytics server 118, and/or the account server 102. Also, the analytics database 119, the account database 104, and/or a database associated with the content cache server 116 and/or the content server 112 may include aspects of the database 314. Also, aspects of the database 314 can be stored and executed locally on the client device hosting the client-side application 303. Also, the database 314 can include the account database 104 and/or the analytics database 119, and can be communicatively coupled to the account server 102 and/or the analytics server 118.

In an example, a component associated with or part of the database 314 can decode the encoding, decompress the compression, and log the decoded and decompressed data. The decoded and decompressed data can then be utilized by an analytics system, such as a system provided by the analytics server 118 and analytics database 119.

In an example that uses an HTTP post, the post can use AJAX or another format for communicating web application information across various platforms. In an example, the communication interface 310 can communicate cross-domain communications, such as cross-domain HTTP posts. In this example the code builder 304 can use credentials standard, such as Cross-Origin Resource Sharing (CORS) if the client-side application 303 supports CORS. Alternatively, to support cross-domain communications, the code builder 304 or another aspect of the system 300 can use hidden tags. For example, a web browser can use hidden <form> tags that target respective hidden <iframe> tags.

Regarding the threads of the system 300, a thread of the communication interface 310 may be a foreground thread of the client-side application 303 or an operating system running the client-side application 303. A thread of the code scanner 302, the code builder 304 and/or the trackers 312 and 320 may be a foreground thread of the client-side application 303 or an operating system running the client-side application 303. A thread of the serialization device 306 and the code compressor 308 may be a background thread of the client-side application 303 or an operating system running the client-side application 303. Alternatively, the thread of the serialization device 306 may be a foreground thread of the client-side application 303 or an operating system running the client-side application 303. Any combination or all of the threads associated with the system 300 may be one or more threads. For example, all the background processes may run on one thread, and all the foreground processes may run on another thread. Also, each process may have a dedicated thread.

In an example system 300, the system 300 may run one or more foreground threads for the operations of the code scanner 302, the code builder 304, the trackers 312 and 320, and the communication interface 310, and run one or more background threads for the serialization device 306 and the code compressor 308. Alternatively, the system 300 may run one or more foreground threads for the operations of the code scanner 302, the code builder 304, the trackers 312 and 320, the serialization device 306, and the communication interface 310, and run one or more background threads for the code compressor 308.

Also, for example, the system 300 may run one or more foreground threads for the operations of the communication interface 310, and run one or more background threads for the code scanner 302, the code builder 304, the trackers 312 and 320, the serialization device 306 and the code compressor 308. The aforementioned are just three example arrangements of threads, and there may be other useful variations of arranging the operations of the system 300 over background and foreground threads.

Each aspect of the system 300 may be implemented through at least an interpreted computer programming language (such as JAVASCRIPT or PHP) or an object-oriented computer language (such as DART). These aspects of the system 300 may be implemented via respective applets and/or scripts dedicated to each component of the system separately or combined. Each of the components of system 300, such as the code compressor, may be implemented by a web worker.

A web worker, as defined by the World Wide Web Consortium (W3C) and the Web Hypertext Application Technology Working Group (WHATWG), is a JavaScript script executed from an HTML page that runs in the background, independently of other user-interface scripts that may also have been executed from the same HTML page. See http://en.wikipedia.org/wiki/Web_worker. A web worker can be any script or applet executed from a client-side application that runs in the background, independent of other scripts, applets, or built-in components of the client-side application that run in the foreground. Web workers may include long-running scripts that are not interrupted by user-interface scripts (scripts that respond to clicks or other user interactions). This allows the processor intensive tasks of the components of the system 300 to relatively not interfere with user interface operations of the client-side application 303, for example. Also, the web worker may limit interference with the task of the communication of the data packets. In one example, a web worker can manage simultaneous execution of foreground browser threads and background threads, such as background JAVASCRIPT threads. Also, the web worker can be dedicated to background threads of the client-side application.

In one example, the background processes of the client-side application 303 and the processes described herein may follow a single thread of execution, except for the code compression, so that the various processes of the system occur in a predetermined sequence and the compression can have a dedicated thread. Because the sequence can be predetermined and the amount of data to be processed can be predetermined, timing of the scanning, building, tracking, serialization, and compression can be predicted, and this prediction can be used to coordinate the timing of the communication of the packets by the communication interface 310.

The web worker may be dedicated to one of the processes of the system 300, such as the compression, or shared by any combination of the processes, such as the serialization and the compression. When the web worker runs on a background thread, it may not have direct access to the structure and organization of the content 316, such as DOM of an electronic property. In an example, messaging, such as messaging via SOAP, may be utilized to communicate with the DOM when the web worker is running in the background. In an example, the scanning and/or the building processes can be throttled in a batch process, so that more information per message can be communicated to the web worker. For example, with the throttling, more information can be transferred per message from a thread running the scanning and/or the building to a thread running the serialization and/or compression. In an example, the message is the aspect of the system 300 that is serialized and compressed. The message can include data from regular scanning processes (e.g. code scanning 422 or 522) or the throttled scanning processes (e.g., throttled scanning 622).

The system 300 can include several other features, not depicted in FIG. 3, that can be performed through one or more of the aforementioned components of the system 300.

The system 300 can include an add modules device for adding sections or modules of a page view to track. The system 300 can also include a remove modules device for removing sections or modules of a page view to track. The add modules device can be configured to receive an array of strings, a single string, or a multi-dimensional map object, representing element identifications to section or modules to track. The remove modules device can receive the same, but to identify sections and modules not to track. Also, the add modules device can be configured to receive an instruction to track or not track a page view entirely. At least parts of the add modules device and the remove modules device can be executed by the code scanner 302, and the add modules device and the remove modules device, on the fly, can add and remove, respectively, sections or modules of the page view to track dynamically. This can be especially useful when content sections and modules are added and removed dynamically to a page view without any refreshing of the page view.

The system 300 can include a refresh modules device for refreshing sections or modules of a page view. The refresh modules device can be configured to receive an array of strings, a single string, or a multi-dimensional map object, representing element identifications to sections or modules to refresh. Also, the refresh modules device can be configured to log any refreshing of a module or a section along with a respective page view identification. Also, the refresh modules device can be configured to not run when no new modules or sections have been added or removed since a prior scan. A separate device can be executed to determine whether a module or section is being tracked and then inform the refresher. Also, the refresh modules can be configured to capture recently updated data in a page view and and not previously viewed content.

At least parts of the refresh modules device can be executed by the code scanner 302 or the code builder 304, and the refresh modules device, on the fly, can refresh sections or modules of the page view dynamically. This can be especially useful when content sections and modules are added and removed dynamically to a page view without any refreshing of the page view. In this sense, the entire page view is not refreshed, but sections and modules can be individually refreshed. In an example, the entire page view can be refreshed. Also, refreshed to the page view, sections, and modules can occur in the system 300 without requesting a refresh from a device external to the device hosting the client-side application 303.

The system 300 can include an add event signal device for beaconing a selected event, such as a certain click event on a page view. The add event signal device can be configured to receive a string that can identify the selected event. The device can be configured to also receive an object including key value pairs to add parameters associated with a respective page view or the selected event. The device can also receive an identification of an outcome of the selected event. The outcome of the selected event can be logged by the user interaction tracker 312, for example. Such a log can be used to map outcomes in a page view by the code builder 304. These mapped outcomes can be part of the hierarchical representation of at least part of the one or more sections and/or the one or more identified anchors. At least part of the add event signal device can be executed by the user interaction tracker scanner 312, and the device, on the fly, can beacon a certain event dynamically. This can be especially useful when click opportunities are added dynamically to a page view without any refreshing of the page view.

The system 300 can include an add click-event signal device for beaconing a selected click-event. The add click-event signal device can be configured to receive a string that can identify a page view section associated with the click-event, a string describing a link associated with the click-event, and a value representing the link position relative to other links within the section, for example. The add click-event signal device can also receive key/value pairs that can be passed along with the click-event beaconing. This device can also receive an identification of an outcome of the selected click-event. The outcome of the selected click-event can be logged by the user interaction tracker 312, for example. Such a log can be used to map outcomes in a page view by the code builder 304. These mapped outcomes can be part of the hierarchical representation of at least part of the one or more sections and/or the one or more identified anchors. At least part of the add click-event signal device can be executed by the user interaction tracker scanner 312, and the device, on the fly, can beacon a certain click-event dynamically. This can be especially useful when click opportunities are added dynamically to a page view without any refreshing of the page view. Also, the device can be especially useful when links exist on the page view that the other devices and features of the system 300 cannot track. For example, difficult to track links usually occur within or are associated with code sections, such as JavaScript handlers, used for interrupts, such as interrupts that prevent unwanted event propagation.

The system 300 can include an add page view signal device for beaconing a selected page view. The add page view signal device can be configured to receive an object including key value pairs to add parameters associated with a respective page view. This device can modify page view parameters associate through a session identifier of the page view, for example. One or more page view parameters can identify whether and how a page view is to be analyzed by analytics, for example. At least part of the add page view signal device can be executed by the code scanner 302 and/or the code builder 304, and the device, on the fly, can beacon a page view dynamically. This can be especially useful when page views are dynamically added to tracked page views when neither the new page view requested nor the previously tracked page views are re-requested by the client-side application 303.

FIGS. 4-6 illustrate example operations performed by example systems that can perform client-side compression of data for communication to a server (such as the system 300 of FIG. 3).

In FIGS. 4-6, the code scanner 302 can perform the code scans 422, 522, and 622 in the respective threads 416, 516, and 616; and these scans can relate to eventual respective code compressions 432, 532, and 632.

The code builder 304 can perform the code builds 424, 524, and 624 in the respective threads 416, 516, and 616; and these builds can be based on the respective scans 422, 522, and 622.

The user interaction tracker 312 can perform the user interaction trackings 426, 526, and 626 in the respective threads 416, 516, and 616; and these trackings can be based on the respective builds 424, 524, and 624 and/or the respective content trackings 428, 528, and 628.

The content tracker 320 can perform the content trackings 428, 528, and 628 in the respective threads 416, 516, and 616; and these trackings can be based on the respective builds 424, 524, and 624 and/or the respective user interaction trackings 426, 526, and 626.

The serialization device 306 can perform the data serializations 430, 530, and 630 in the respective threads 418, 518, and 618; and these serializations can be based on the respective builds 424, 524, and 624, the respective user interaction trackings 426, 526, and 626, and/or the respective content trackings 428, 528, and 628.

The code compressor 308 can perform the code compressions 432, 532, and 632 in the respective sixth threads 418, 518, and 618; and these compressions can be based on the respective serializations 430, 530, and 630.

The communication interface 310 can perform communication processes 434, 534, and 634 in the respective threads 416, 516, and 616. These communication processes can include the sending of compressed data to appropriate recipients, such as account servers and analytics servers.

Not depicted are the encoding processes that can occur just prior to the compressions 432, 532, and 632. The encoding processes are described above in the sections describing FIG. 3. The encoding processes can run on the foreground thread(s) 416, 516, or 616 or the background thread(s) 418, 518, or 618, depending on the configuration of the system 300. In an example configuration, the encoding processes run on the background thread(s) 418, 518, or 618, synchronized with the compressions 432, 532, or 632, respectively.

Each operation illustrated in FIGS. 4-6 can run on one or more background threads and/or one or more foreground threads. Also, a foreground thread or a background thread can share multiple operations illustrated in FIGS. 4-6.

The threads described herein can run synchronously and/or asynchronously. For example, the threads in FIGS. 4-6 are illustrated running synchronously, since each thread includes at least one operation that depends on at least one operation of another thread. For example, at 420, 520, or 620, the system 300 can receive a page view during a respective first period 440a, 540a, or 640a. Then during a respective second period 440b, 540b, and 640b, the code scanner 302 can scan at least part of the received page view. Since the scanning of the page view depends on receiving the page view, these two operations are synchronous processes. Processes such as the user interaction trackings 426, 526, and 626 and the content trackings 428, 528, and 628, can be synchronous and/or asynchronous depending on respective configurations of the user interaction tracker 312 and the content tracker 320. In the FIGS. 4-6, these operations are synchronous. Synchronizing these operations can be advantageous when a server receiving the compressed data is expecting to receive the compressed data within certain time slots.

Figure 7:
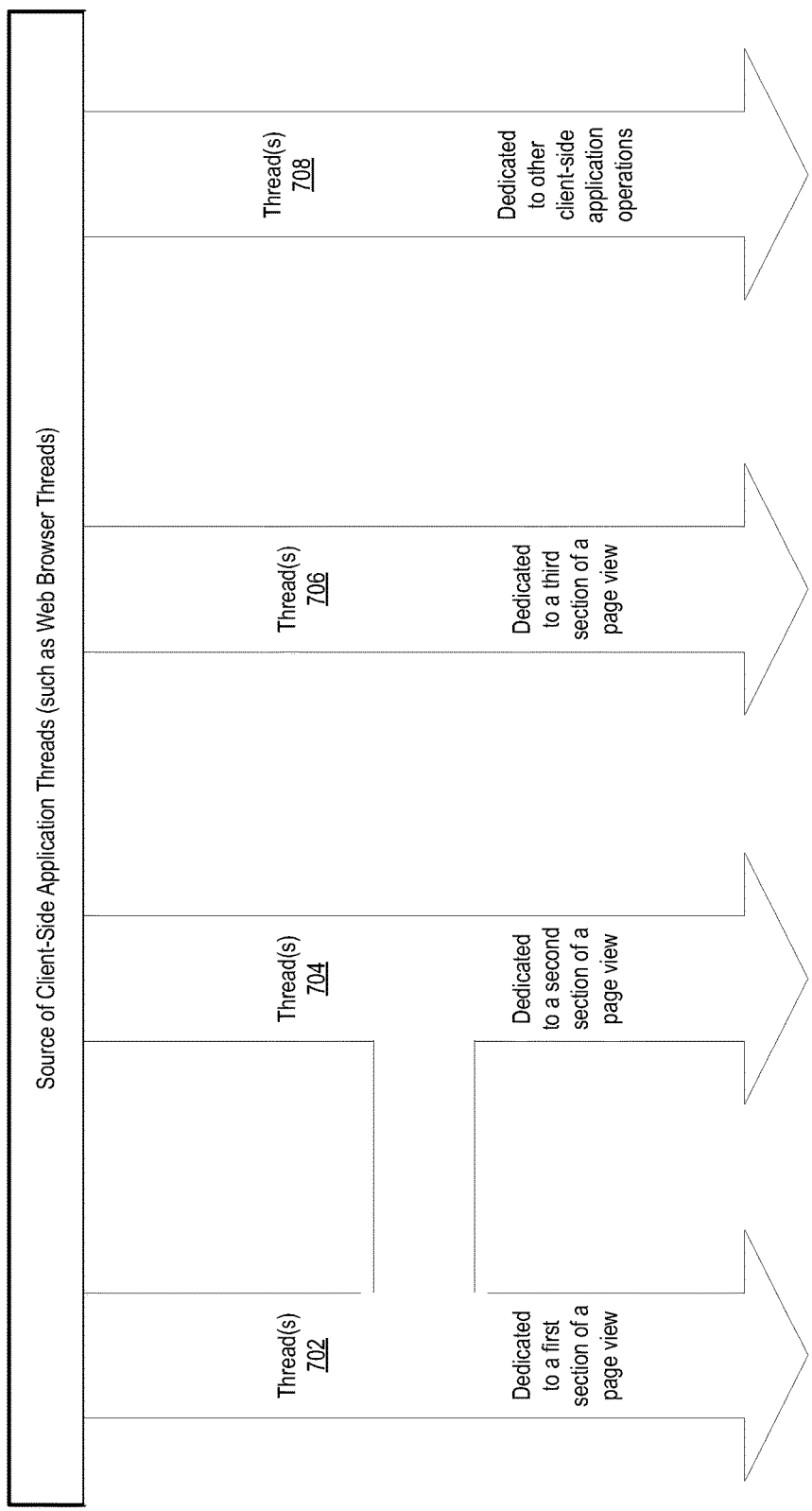
FIG. 7 depicts one or more threads that can run operations of FIGS. 4-6 and other client-side application operations.

FIG. 7 depicts one or more threads 702 that can run operations of FIGS. 4-6 with respect to a first, a second, and a third section of a page view. The one or more threads 704 are synchronous with the thread(s) 702 because the thread(s) 704 have at least one operation that depends on an operation of the thread(s) 702. The one or more threads 706 are asynchronous with respect to the thread(s) 702 and 704. The amount of sections of a page view that can have each have their own thread can depend on the amount of resources available. In such examples, because of limitations in resources, sections can have different priorities for receiving operations via dedicated threads.

FIG. 7 also depicts one or more threads 708 that can run operations independent of the operations associated with the page view, such as client-side application security operations, resource sharing operations with other applications executing on the host operating system, and caching unrelated to the page view. The one or more threads 708 can be asynchronous with respect to the one or more threads dedicated to the page view (e.g., one or more threads 702-706).

Referring back to FIGS. 4-6, the periods 440a-440e, 540a-540e, and 640a-640e represent non-overlapping periods. Operations that span only one period within each of the periods of FIGS. 4-6 may not overlap with single period spanning operations of other periods. Operations that span more than one period can overlap with other operations that exist within those periods.

Referring to FIG. 4, the system 300 can dedicate resources to receiving an initial data corresponding to a page view at 420, within the first period 440a. At 422, the code scanner 302 can scan one or more sections of the page view identified to be scanned, within the second period 440b. At 424, the code builder 304 can build a data model representative of the one or more scanned sections of the page view. As depicted, the code building 424 and the code scanning 422 can occur within the same time period. For example, after a first section has been scanned, a second section can be scanned while the data model for the first section is being built. An item of the page view may not be included within the built data model until it has been scanned.

At 426, the user interaction tracker 312 can track user interactions with aspects stored in the built data model. The user interactions can also be tracked with respect to content aspects being tracked at 428. For example, if bolding of font is being tracked and font became bold due to a user interaction, the prior user interaction associated with the bolded font can be tracked without referring back to the built data model. Also, specified user interactions can be tracked whether or not they are associated with aspects stored in the built data model, depending on the configuration of the user interaction tracker 312.

At 428, the content tracker 320 can track aspects of the content associated with aspects of the page view stored in the built data model. The content aspects, such as graphical formatting aspects, can also be tracked with respect to user interactions being tracked at 426. For example, if a click on text of a hyperlink is being tracked and it is known that such a user interaction causes the text of the link to become red, then the text turning red can be tracked by an inference after a click on text of a hyperlink has been made. Also, specified content aspects can be tracked whether or not they are associated with aspects stored in the built data model, depending on the configuration of the content tracker 320.

At 430, the serialization device 306 can serialize data derived from the code building at 424, the user interaction tracking at 426, and/or the content tracking at 428. As shown in FIG. 4, the third time period 440c including the serialization at 430 does not overlap with the second period 440b, which includes the scanning 422, the code building 424, and the trackings 426 and 428. In other words, in the example of FIG. 4, the serialization at 430 of the data associated with one or more sections of the page view, derived from the scanning 422, the code building 424, and the trackings 426 and 428, may not occur until the scanning, the code building and the trackings are completed for those one or more sections.

At 432, the code compressor can compressed the data serialized at the serialization 430. Since the compression 432 occurs within the fourth period 440d, the compression 432 may not occur until the respective serialization 430 is completed. At 434, the communication interface 310 can communicate the data compressed at the compression 432. Since the communication of the compressed data 434 occurs with the fifth period 440e, the communication 434 may not occur until the respective compression 432 is completed.

During the occurrences of the scanning 422, the building 424, the trackings 426 and 428, the serialization, the compression, and the communicating, the system 300 can receive updated information for the page view and update the content within the page view accordingly at 440. The updated content can then be scanned at 422, and so on, until the updated content and interactions associated with the content are logged at 424-428, serialized at 430, compressed at 432, and communicated at 434.

Referring to FIG. 5, the system 300 can dedicate resources to receiving initial data corresponding to a page view at 520, within the first period 540a. At 552, the system 300 can dedicate resources to updating content of the page view within a cache associated with the page view, within the periods 540b-540d. For example, a cache thread can be dedicated to the updating of the content within the cache of the page view, within the periods 540b-540d. Also, within the periods 540*b*-540*d*, at 540, content can be updated within the page view according to the content information updated in the cache at 552. These content updating operations can occur simultaneously as code scanning of previous content of the page view at 552, respective code building 524 based on the scanning at 522, respective trackings at 526 and 528, respective serialization at 530, and respective compression at 532. Similarly, these content updates can span across the periods 540*b*-540*d*.

At 522, the code scanner 302 can scan one or more sections of the page view identified to be scanned, within the second period 540*b*. This can occur during the updates at 552 and 540. The scanning of the updates can occur afterwards.

At 524, the code builder 304 can build a data model representative of the one or more scanned sections of the page view. As depicted, the code building 524 and the code scanning 522 can occur within the same time period as the updates at 552 and 540. After a first section has been scanned, a second section can be scanned while the data model for the first section is being built. The second section can include content updates to the cache at 552 or to the actual page view at 540. In general, an item of the page view may not be included within the built data model until it has been scanned, whether that item was originally received or is an update during a client-side application session is irrelevant.

At 526, the user interaction tracker 312 can track user interactions with aspects stored in the built data model. The user interactions can also be tracked with respect to content aspects being tracked at 528, whether those content aspects being tracked were presented or merely cached. For example, if bolding of font is being tracked and font became bold, on the display or at least in the cache, due to a user interaction, the prior user interaction associated with the bolded font can be tracked without referring back to the built data model. Also, specified user interactions can be tracked whether or not they are associated with aspects stored in the built data model, depending on the configuration of the user interaction tracker 312.

At 528, the content tracker 320 can track aspects of the content associated with aspects of the page view stored in the built data model, whether the content was displayed after 540 or merely cached at 552. The content aspects, such as graphical formatting aspects, can also be tracked with respect to user interactions being tracked at 526, whether those formatting aspects were displayed after 540 or merely cached at 552. For example, if a click on text of a hyperlink is being tracked and it is known that such a user interaction causes the text of the link to become red, then the text turning red can be tracked by an inference after a click on text of a hyperlink has been made. Also, specified content aspects can be tracked at the updating of the page view at 540 and/or at the updating of the cache at 552, whether or not they are associated with aspects stored in the built data model, depending on the configuration of the content tracker 320.

At 530, the serialization device 306 can serialize data derived from the code building at 524, the user interaction tracking at 526, and/or the content tracking at 528. As shown in FIG. 5, the third time period 540*c* including the serialization at 530 does not overlap with the second period 540*b*, which includes the scanning 522, the code building 524, and the trackings 526 and 528. In other words, in the example of FIG. 5, the serialization at 530 of the data associated with one or more sections of the page view, derived from the scanning 522, the code building 524, and the trackings 526 and 528, may not occur until the scanning, the code building and the trackings are completed for those one or more sections.

At 532, the code compressor can compressed the data serialized at the serialization 530. Since the compression 532 occurs within the fourth period 540*d*, the compression 532 may not occur until the respective serialization 530 is completed. At 534, the communication interface 310 can communicate the data compressed at the compression 532. Since the communication of the compressed data 534 occurs with the fifth period 540*e*, the communication 534 may not occur until the respective compression 532 is completed.

As mentioned, during the occurrences of the scanning 522, the building 524, the trackings 526 and 528, the serialization 530, the compression 532, and the communicating 534, the system 300 can receive updated information for the page view and update the content within the page view at the actual page view accordingly at 540 or update the content within a cache associated with the page view at 552. The updated content can then be scanned at 522, and so on, until the updated content and interactions associated with the content are logged at 524-528, serialized at 530, compressed at 532, and communicated at 534.

Referring to FIG. 6, the system 300 can dedicate resources to receiving an initial data corresponding to a page view at 620, within the first period 640*a*. At 662, the system 300 can dedicate resources to updating content of the page view within a cache associated with the page view, within a period 660 dedicated to the updating of the content of the page view within the cache. This cache may include a queue and/or a stack, and may reside on a server, such as the content cache server 116. The period 660 can also be dedicated to communication of the cached items to throttled scanning 622 and/or updating of the content within the page view at 640. The time period dedicated to updating the cache within page view items at 662, can also be referred to as the cache period 660.

Having the dedicated period for gathering future displayed content can be especially useful for the throttled scanning 622. The throttled scanning 622 can include batch scanning of data associated with the page view, whether that content has been presented to a user or is hidden in the cache. For example, the throttled scanning can include batch scanning of the DOM of the page view, so that for example a large part of the data representing the page view is scanned within a period of time. This can provide for more efficient building at 624 since most of the data representing the page view is provided, for example. This throttling allows for more efficient tracking at 626 and 628 for similar reasons. The serialization 630 and the compression at 632 can be especially more efficient for similar reasons. In the examples depicted, since serialization 630 and compression 632 have one or more dedicated threads 618 that can run simultaneously with the foreground thread(s) 616, the size of the data to serialize and compress does not affect the presentation and rendering of the page view. Therefore, the serialization 630 and the compression 632 can provide large amounts of compressed data to send at a time to a server, such as an analytics server. This can be especially useful for complex page views.

Also, due to the cache period 660 and the dedicated cache update 662, the caching of the update to the display view can happen at a very fast rate. This acceleration can optimize a stream of content, especially a stream of an apparent endless sequence of items, such as the endless sequence of items referred to in the description of FIG. 2 and FIG. 9. Each item can render to the screen more quickly once that item has been cached. Furthermore, as more items are cached quicker, the cached items can be more likely to keep up with a rate of a user scrolling through new items. The more resources dedicated to this process the more seamless the stream appears.

With the acceleration of content, a stream of items may seem endless and seamless. Having an item cached prior to displaying it will quicken the display of that item, compared to first requesting the item from a content source and then displaying it. In other words, the cache can act as a queue. Also, by dedicating the cache period 660 to the cache update 662 other, threads and operations of the system 300 may not interfere or compete for resources in the updating of the cache. Furthermore, this process can have its own dedicated thread (which is not depicted in FIG. 6). Hence, the cache is rapidly updated, and an associate stream of content appears to be more endless and seamless than a system not rapidly updating its cache of page view items in a similar manner.

Also, because caching of new items is accelerated at 662, the code scanning to serialization, compression, and sending off the compressed data associated with the new items can happen more often within a given period of time. As a result, a receiving account server or analytics server can benefit from information on cached new items earlier. These servers can then provide feedback to content sources or the cache (which can be hosted on a server for example) for providing new content items for the page view. Therefore, the new items, such as new items in a stream, can be better targeted.

With respect to the example illustrated in FIG. 6, within the periods 640b-640e, content can be updated within the page view according to the content information updated in the cache by a normal caching process at 652 or by an accelerated caching process at 662, at 640. The content updating operations at 652 and at 640 can occur during the occurrences of the throttled code scanning of previous content of the page view at 622, the respective code building at 624 based on the throttled scanning at 622, the respective trackings at 626 and 628, the respective serialization at 630, and the respective compression at 632.

At 622, in an example situation, the code scanner 302 can scan the sections of the page view identified to be scanned, within the second period 640b. This can occur even if the page view is complex and has streams of content. The throttled scanning 622 can occur during the updates at 652 and 640 and for content updates received immediately prior, such as content updates derived from the accelerated cache update at 662, the normal cache update at 652, and/or the displayed items update at 640, received immediately prior the latest received content updates. The system 300 can be configured to run the throttled scanning 622 and not configured to run the accelerated caching 662. With normal caching 652 and/or the accelerated caching, the throttled scanning 662 can wait until a threshold amount of data has been cached. Also, in an example configuration, the throttled scanning 622 can wait to initiate until the data associated with the page view is either displayed and/or cached. Also, the scanning at 622 can occur via operations described in FIG. 8, for example.

At 624, the code builder 304 can build a data model representative of the one or more scanned sections of the page view, including sections associated with the updates from the operations at 662, 652, and/or 640, for example. As depicted, the code building 624 and the code scanning 622 can occur within the same time period as the updates at 652 and 640. Also, even with throttled scanning, after a first section has been scanned, a second section can be scanned while the data model for the first section is being built. However, the building in one section is still synchronized with the throttled scanning of that section. Given this, the second section can include accelerated content updates to the cache at 662, regular updates to the cache at 652, or updates to the actual page view at 640, during scanning of and building of code associated with the first section.

At 626, the user interaction tracker 312 can track user interactions with aspects stored in the built data model. The user interactions can also be tracked with respect to content aspects being tracked at 628, whether those content aspects being tracked were presented or merely cached through the throttled cache update 662 or the normal cache update 652. For example, if bolding of font is being tracked and font became bold, on the display or at least in the cache, due to a user interaction, the prior user interaction associated with the bolded font can be tracked without referring back to the built data model. Also, specified user interactions can be tracked whether or not they are associated with aspects stored in the built data model, depending on the configuration of the user interaction tracker 312.

At 628, the content tracker 320 can track aspects of the content associated with aspects of the page view stored in the built data model, whether the content was displayed after 640 or merely cached through the throttled cache update 662 or the normal cache update 652. The content aspects, such as graphical formatting aspects, can also be tracked with respect to user interactions being tracked at 626, whether those formatting aspects were displayed after 640 or merely cached at 652 or at 662. For example, if a click on text of a hyperlink is being tracked and it is known that such a user interaction causes the text of the link to become red, then the text turning red can be tracked by an inference after a click on text of a hyperlink has been made. Also, specified content aspects can be tracked at the updating of the page view at 640, at the updating of the cache at 652, or updating at the throttled cache update 662, whether or not they are associated with aspects stored in the built data model, depending on the configuration of the content tracker 320.

At 630, the serialization device 306 can serialize data derived from the code building at 624, the user interaction tracking at 626, and/or the content tracking at 628. As shown in FIG. 6, the third time period 640c including the serialization at 630 does not overlap with the second period 640b, which includes the scanning 622, the code building 624, and the trackings 626 and 628, nor does it overlap with the cache period 660. In other words, in the example of FIG. 6, the serialization at 630 of the data associated with one or more sections of the page view, derived from the scanning 622, the code building 624, and the trackings 626 and 628, may not occur until the respective caching, the respective scanning, the respective code building, and the respective trackings are completed for those one or more sections.

At 632, the code compressor can compressed the data serialized at the serialization 630. Since the compression 632 occurs within the fourth period 640d, the compression 632 may not occur until the respective serialization 630 is completed. At 634, the communication interface 310 can communicate the data compressed at the compression 632. Since the communication of the compressed data 634 occurs with the fifth period 640e, the communication 634 may not occur until the respective compression 632 is completed.

As mentioned, during the occurrences of the scanning 622, the building 624, the trackings 626 and 528, the serialization 630, the compression 632, and the communicating 634, the system 300 can receive updated information for the page view and update the content within the page view at the actual page view accordingly at 640 or update the content within a cache associated with the page view at 652 or at 662. The updated content can then be scanned at 622, and so on, until the updated content and interactions associated with the content are logged at 624-628, serialized at 630, compressed at 632, and communicated at 634.

Figure 8:
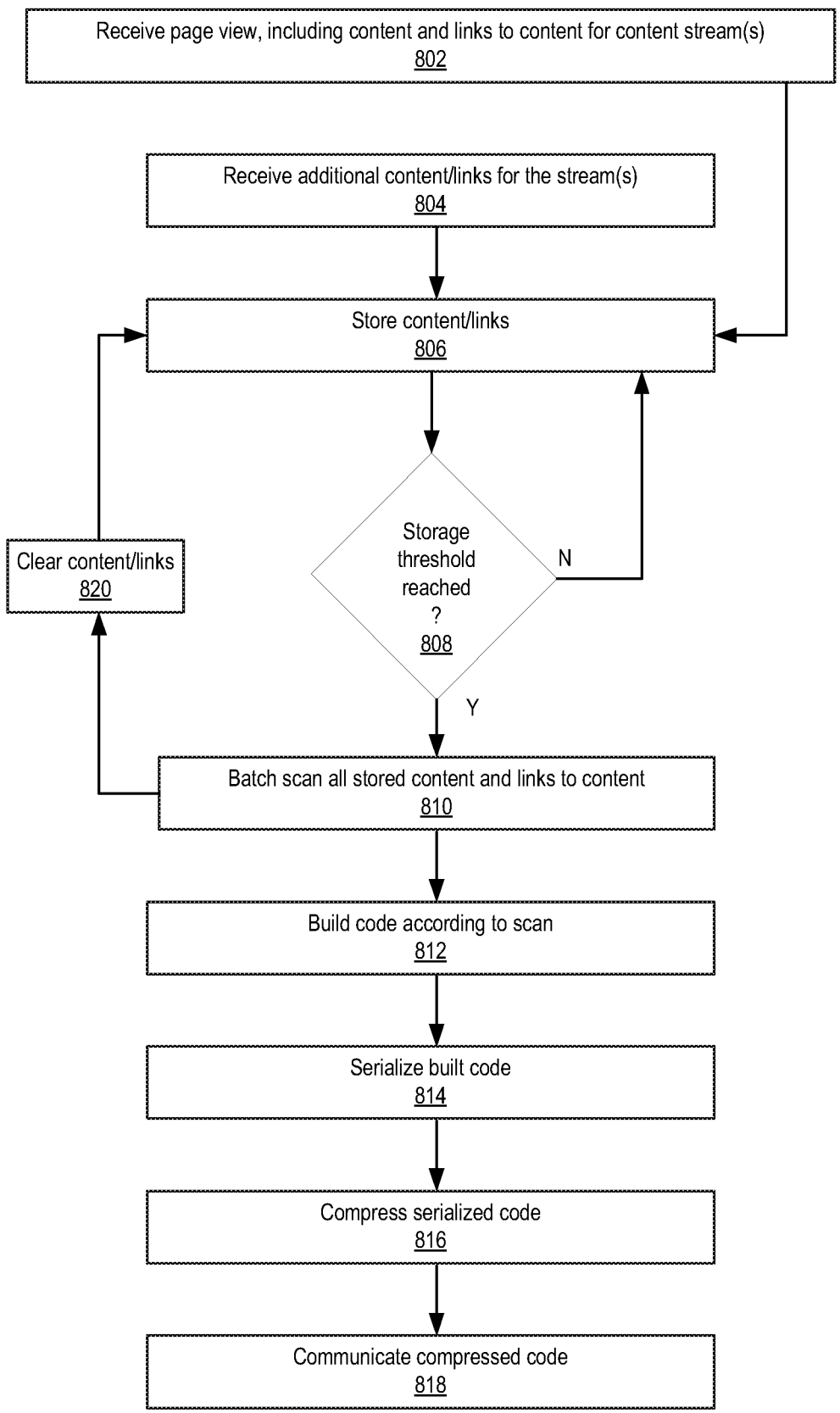
FIG. 8 illustrates example operations performed by example systems that can throttle the client-side compression of data for communication to a server (such as the system 300 of FIG. 3), via batch processing of the scanning of the data prior to the compression.

FIG. 8 illustrates example operations performed by example systems that can throttle the client-side compression of data for communication to a server (such as the system 300 of FIG. 3), via batch processing of the scanning of the data prior to the compression.

For example, the system 300 can receive data associated with an initial rendering of a page view in a session of a client-side application, at 802. That first page view can include at least one streaming section of content. The system can then receive additional data associated with additional content to stream in the at least one stream section of content, at 804. The initial content and the additional content can be received within the session of the client-side application. The initial and the additional content include the content to be rendered and/or links to the content to be rendered. The additional data can be representative of the additional content for display in one or more additional views of the at least one streaming section of content. The initial data can be representative of the initial content for display in the initial view of the at least one streaming section of content. Also, the received data before processing can be stored, at 806, in a remote cache, such as the cache of the content cache server 116, or a local cache, such as a cache associated with the client-side application hosted by a client device hosting the client-side application.

The additional content can continue to be received until a cache threshold amount of data for the at least one streaming section is reached. At 808, the system 300 can determine whether the cache threshold has been reached. The threshold amount of data stored in the cache can be predetermined and be configured by a server eventually receiving the data in a compressed form. If the threshold is determined not to be reached, then the system can continue to receive the additional data at 806.

At 810, due to the received additional data meeting the cache threshold, the code scanner 302 can scan at least the cached initial data and the cached additional data, for the at least one streaming section of content, via a batch process. Once the batch process is performed at 810, the data can be cleared from the cache at 820 and the system can then continue to receive more data at 806. The initial data and the additional data can be data associated with content and/or hyperlinks to content.

Alternatively, any data received for the page view can be queued to be scanned by the code scanner, and the code scanner can continue with a batch process of scanning that data until a threshold amount of data is reached for scanning. In the alternative example, the limiting of the amount of scanning per batch is during the scanning processes opposed to prior to the scanning processes, such as at the tracking of the associated cache.

At 812, the code builder 304 can build code according to the scanning via the batch process at 810. At 814, the built code can be serialized. At 816, the serialized code can be compressed, and then at 818, the compressed code can be communicated to a server, such as the analytics server 118.

Figure 9:
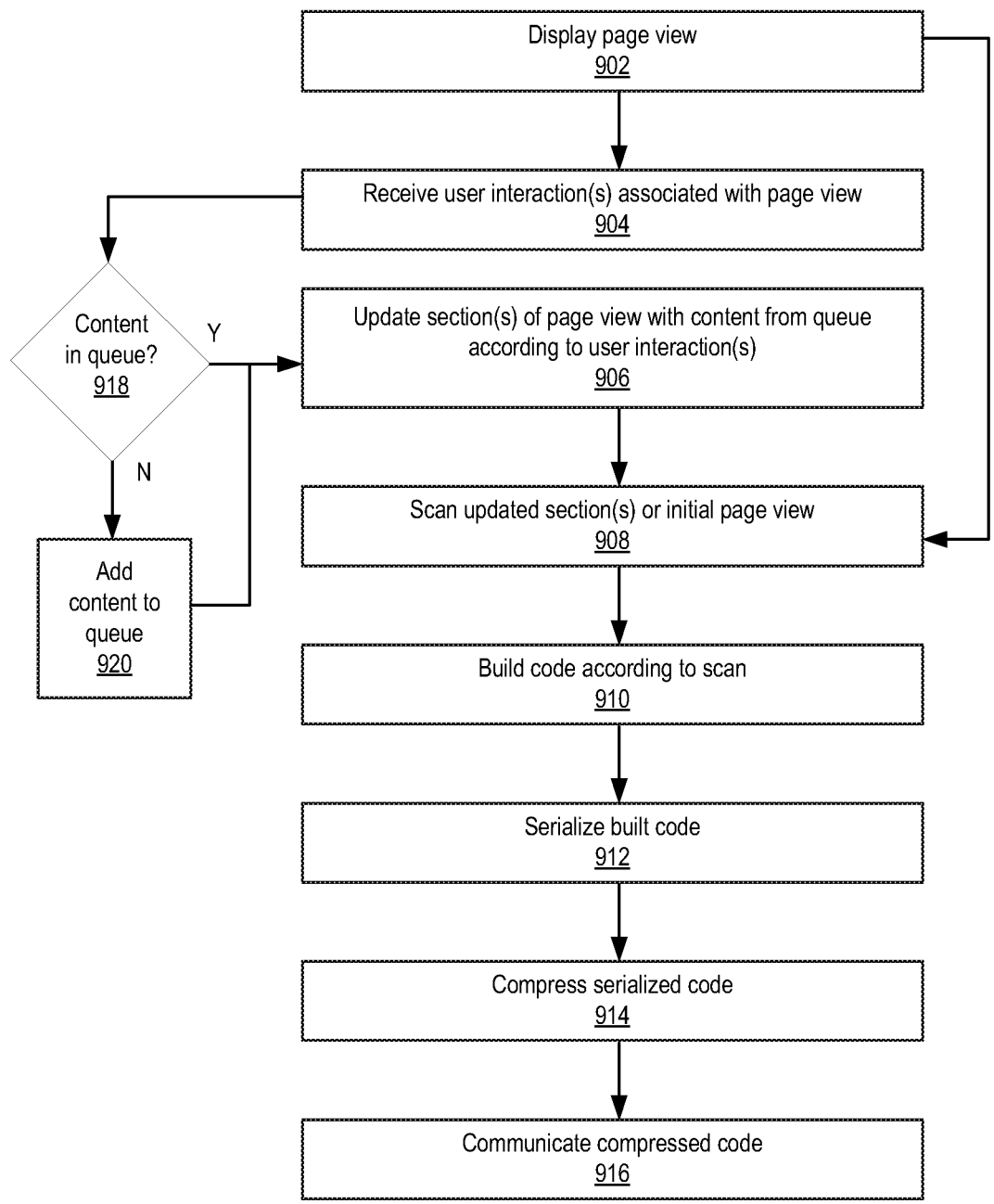
FIG. 9 illustrates example operations performed by example systems that can render a page view that appears to stream an infinite amount of seamless content and can perform client-side compression of data associated with the seamless content, for communication to a server (such as the system 300 of FIG. 3).

FIG. 9 illustrates example operations performed by example systems that can render a page view that appears to stream an infinite amount of seamless content and can perform client-side compression of data associated with the seamless content for communication to a server (such as the system 300 of FIG. 3). Also, in an example, the client-side compression of the seemingly infinite stream of content can be optimized by the operations illustrated in FIG. 8.

The seemingly infinite stream of content can begin at 902, with displaying a page view on a display device of the client device 301. The page view in its initial presentation can include at least one section of the streaming content that appears to be infinite. At 904, a user interface associated with and/or included in the page view can receive at least one user interaction. The initial display of the page view and the user interaction(s) occurs within a session of the page view. At 906, the page view can update at the section(s) with at least one new content item in response to the user interaction(s). This update also occurs within the session of the page view. The new content item can be derived from a link in a queue associated with a section for example. The queue can be hosted by a server, such as the content cache server 116. The page view can repeat updating of a section with a new content item every time a new user interaction associated with that section is received within the session of the page view. This can occur until no new content items exist in the queue for that section. The queue may also be universal to the page view or a respective web property, such as an entire website. During these updates, the system 300 can track the new content items as they appear in the sections, the queues, or caches associated with the queues or the sections. In an example, a queue and/or a stack may be used to store the upcoming content.

The tracking of the new content items can include the operations performed by the components of system 300. For example, the tracking can include scanning a document object model of the page view and/or one or more updated sections of the page view to identify the new content items, at 908. The tracking can also include building code representative of the page view and/or one or more updated sections of the page view, at 910. The tracking can also include serializing the built code, at 912; compressing the serialized code, at 914; and communicating the compressed code to a server, such as the analytics server 118, at 916. Not depicted, but found in some examples, is the encoding done on the code prior to the compression at 914.

In an example, at 918, the system 300 or the client-side application 303 for example, can determine whether content items exists in the queue. At 920, as a result of no content items existing in the queue, the content cache server 116, for example, can recycle content used by inserting it back into the queue. Also, at 920, the content cache server 116 for example can retrieve new content from a content source to fill the queue. Content can be added to the queue if content is used up within the session of the page view. Additionally, in the recycling of content, the content cache server 116, for example, can change at least one content item of the content used within the session of the page view. Also, in an example, the queue can be updated with new content opposed to recycled content, as mentioned. Either way, the queue can be continually updated with new and/or recycled content from a plurality of content sources to avoid an occurrence of the session of the page view using up new or recycled content items in the queue. In one example, the amount of new content can make it practically impossible for recycled content items to exist in the queue, within the session. In such an example, the recycling may become obsolete.

Figure 10:
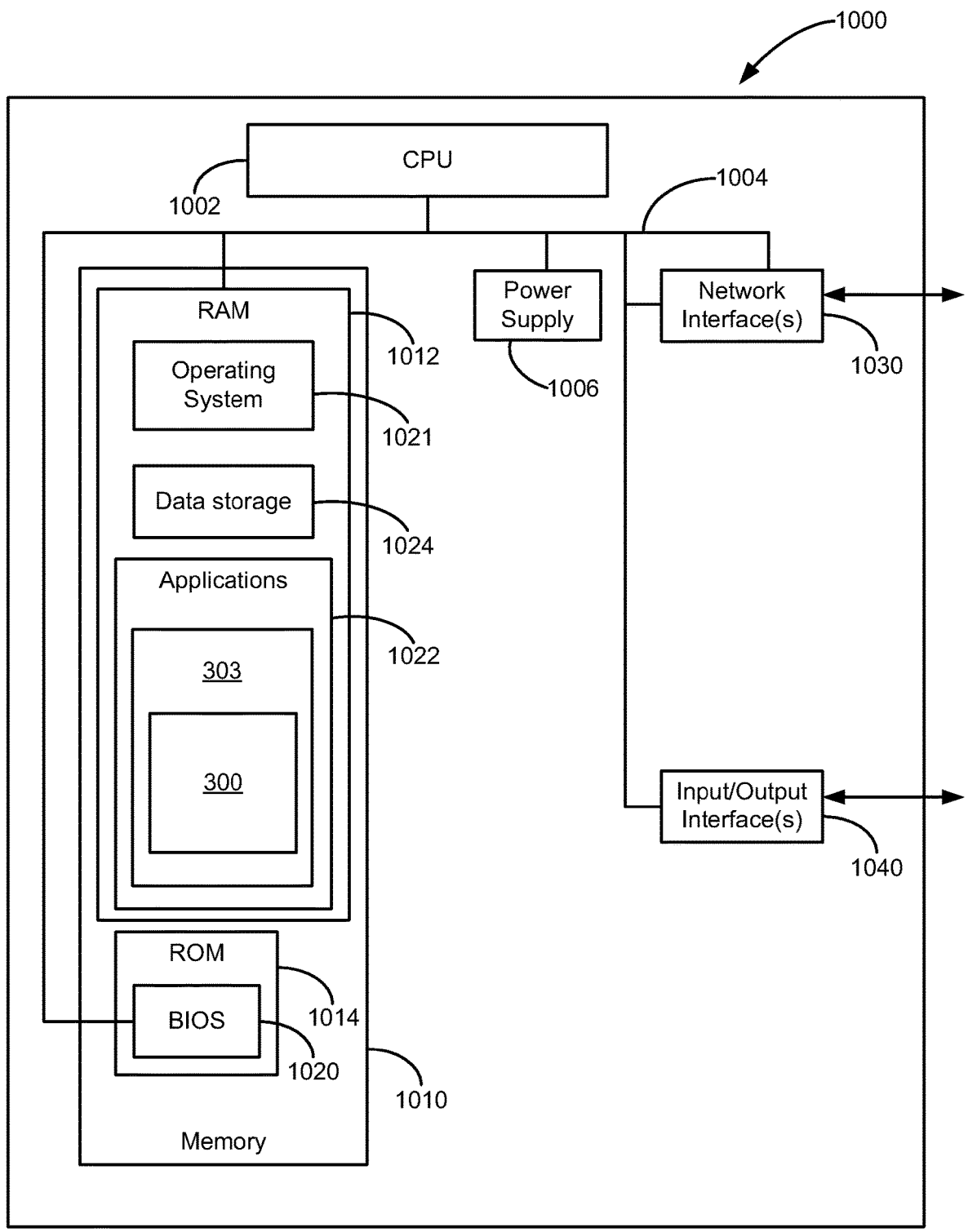
FIG. 10 is a block diagram of an example electronic device that can implement one or more aspects of and related to example systems that can perform client-side compression of data for communication to a server (such as the system 300 of FIG. 3 and systems communicatively coupled to the system 300).

FIG. 10 is a block diagram of an example of an electronic device 1000 that can implement one or more aspects of the system 300 or aspects associated with the system 300, such as the content cache server 116. Instances of the electronic device 1000 may include a server, such as the server 102, 106, 108, 112, 116, or 118, or may include a client device, such as the client device 301. The electronic device 1000 can include a processor 1002, memory 1010, a power supply 1006, and input/output components, such as network interface(s) 1030 and input/output interface(s) 1040, and a communication bus 1004 that connects the aforementioned elements of the electronic device. The network interfaces 1030 can include a receiver and a transmitter (or a transceiver), and an antenna for wireless communications. The processor 1002 can be one or more of any type of processing device, such as a central processing unit (CPU). Also, for example, the processor 1002 can be central processing logic; central processing logic may include hardware, firmware, software and/or combinations of each to perform function(s) or action(s), and/or to cause a function or action from another component. Also, central processing logic may include a software controlled microprocessor, discrete logic such as an application specific integrated circuit (ASIC), a programmable/programmed logic device, memory device containing instructions, or the like, or combinational logic embodied in hardware. Also, logic may also be fully embodied as software. The memory 1010, which can include random access memory (RAM) 1012 or read-only memory (ROM) 1014, can be enabled by one or more of any type of memory device, such as a primary (directly accessible by the CPU) and/or a secondary (indirectly accessible by the CPU) storage device (e.g., flash memory, magnetic disk, optical disk).

The RAM 1012 can store data and instructions defining an operating system 1021, data storage 1024, and applications 1022, including the client-side application 303, aspects of the system 300, and/or instructions to enable aspects of the content cache server 116. Example content provided by an application, such as the content 316, may include text, images, audio, video, or the like, which may be processed in the form of physical signals, such as electrical signals, for example, or may be stored in memory, as physical states, for example.

The ROM can include basic input/output system (BIOS) 1020 of the electronic device 1000. The power supply 1006 contains one or more power components, and facilitates supply and management of power to the electronic device 1000. The input/output components can include any interfaces for facilitating communication between any components of the electronic device 1000, components of external devices (such as components of other devices of the information system 100), and end users. For example, such components can include a network card that is an integration of a receiver, a transmitter, and one or more I/O interfaces, such as input/output interface(s) 1040. A network card, for example, can facilitate wired or wireless communication with other devices of a network. In cases of wireless communication, an antenna can facilitate such communication. The I/O components, such as I/O interface(s) 1040, can include user interfaces such as monitors, keyboards, touchscreens, microphones, and speakers. Further, some of the I/O components, such as I/O interface(s) 1040, and the bus 1004 can facilitate communication between components of the electronic device 1000, and can ease processing performed by the processor 1002.

Where the electronic device 1000 is a server, it can include a computing device that is capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Further, a server may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. Particularly, the server may be an application server that may include a configuration to provide an application, such as the system 300, via a network to other devices. Also, an application server may, for example, host a website that can provide a user interface for the configuring of the system 300.

The invention claimed is:

1. A system comprising:
   a user interface device configured to output data representative of a section of a first page view displayed on a display device, the first page view including first viewable content items of a set of viewable content items, the set of viewable content items comprising second viewable content items that are not displayed with the first viewable content items in the first page view;
   a queue or stack configured to store links to the second viewable content items during the first page view,
   wherein the user interface device is configured to:
      receive a scrolling event to scroll through the set of viewable content items during display of the first page view; and
      in response to the scrolling event, cause the second viewable content items to be displayed in an updated page view on the display device through the links to the second viewable content items stored in the queue or stack; and
   a code scanner configured to scan a document object model of the second viewable content items in response to the scrolling event.

2. The system of claim 1,
   wherein the code scanner is configured to identify at least the first viewable content items and the second viewable content items; and
   wherein the system comprises a code builder configured to build a hierarchical representation of the section and at least the first viewable content items and the second viewable content items.

3. The system of claim 2, comprising:
   a data serialization device configured to serialize the hierarchical representation to generate serialized data.

4. The system of claim 3, comprising:
   a code compressor configured to compress the serialized data to generate compressed data.

5. The system of claim 4, comprising:
   a communication interface configured to communicate the compressed data to an analytics server.

6. The system of claim 4, wherein a thread supporting the code compressor is a background thread of a client-side application.

7. The system of claim 5, wherein a thread supporting the communication of the compressed data to the analytics server is a foreground thread of a client-side application.

8. The system of claim 4, wherein the code compressor is implemented through a web worker.

9. A system comprising:
a display device configured to display first content items of a stream in a first page view and second content items of the stream in a second page view;
a queue or a stack configured to store links to the second content items during the first page view, before the second content items are displayed in the second page view; and
a content control device configured to:
  receive user interaction data indicative of a user input to view more of the stream being displayed by the display device;
  retrieve, from the queue or stack, one or more links of the links in response to the user interaction data; and
  retrieve the second content items in response to retrieval of the one or more links;
wherein the display device is configured to:
  receive the second content items in response to the retrieval of the second content items by the content control device; and
  display the second content items in the second page view.

10. The system of claim 9, comprising:
a scanner configured to generate scanned output data based on a scan of the second content items.

11. The system of claim 9, comprising:
a scanner configured to generate scanned output data based on a scan of the second content items; and
a code builder configured to build code according to the scanned output data to generate build code.

12. The system of claim 11, comprising:
a serialization device configured to serialize the build code to generate serialized code;
a code compressor configured to compress the serialized code to generate compressed code; and
a communication interface configured to communicate the compressed code to a server.

13. The system of claim 12, wherein the code compressor is configured to run on its own thread.

14. A method, comprising:
displaying a page view on a display device, the page view including a first section of streaming content;
storing, in a queue or stack hosted by a server, a link to a second section of a plurality of new sections of the streaming content, wherein the second section is not displayed with the first section during the page view;
receiving, with a user interface device, a user interaction to view more of the streaming content;
in response to receiving the user interaction, retrieving, with a content control device, the link in the queue or stack;
in response to retrieving the link, retrieving, with the content control device, the second section of the streaming content;
in response to retrieving the second section, displaying, on the display device, an updated page view including the second section of the streaming content; and
tracking the second section.

15. The method of claim 14, wherein the tracking of the second section comprises:
scanning document object models of the second section;
identifying new content items included in the second section;
building code representative of the new content items to generate build code;
serializing the build code to generate serialized code;
compressing the serialized code to generate compressed code; and
communicating the compressed code to an analytics server.

16. The method of claim 14, comprising:
recycling content displayed in a prior page view in response to no links to new sections existing in the queue or the stack.

17. The method of claim 14, comprising:
changing at least one content item included in a prior page view in response to no links to new sections existing in the queue or the stack; and
forming a newly updated page view with the at least one content item changed in response to another user interaction to view more of the streaming content.

18. The method of claim 14, wherein the first section includes a list of content items, the list of content items scrollable by the user interaction.

19. The method of claim 18, wherein the user interaction includes at least a click on a scrollbar or a touch gesture over the first section.

20. The method of claim 14, wherein the queue or the stack is continually updated with links to new content from a plurality of content sources to avoid an occurrence of the streaming content ending before a user viewing the streaming content on the display device ends a session of viewing the streaming content.

* * * * *